US011212733B2

(12) United States Patent
Horn et al.

(10) Patent No.: US 11,212,733 B2
(45) Date of Patent: Dec. 28, 2021

(54) CONTROL OF WIRELESS TRANSMISSION BASED ON NODE STATUS

(75) Inventors: Gavin B. Horn, La Jolla, CA (US); Manoj M. Deshpande, San Diego, CA (US); Srinivasan Balasubramanian, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1494 days.

(21) Appl. No.: 12/245,557

(22) Filed: Oct. 3, 2008

(65) Prior Publication Data

US 2009/0092111 A1 Apr. 9, 2009

Related U.S. Application Data

(60) Provisional application No. 60/978,347, filed on Oct. 8, 2007, provisional application No. 60/978,351, filed on Oct. 8, 2007.

(51) Int. Cl.
| | |
|---|---|
| *H04W 48/02* | (2009.01) |
| *H04W 84/04* | (2009.01) |
| *H04W 48/20* | (2009.01) |
| *H04W 48/04* | (2009.01) |

(52) U.S. Cl.
CPC ............ *H04W 48/02* (2013.01); *H04W 48/04* (2013.01); *H04W 48/20* (2013.01); *H04W 84/045* (2013.01); *Y02D 30/70* (2020.08)

(58) Field of Classification Search
USPC ...................................................... 370/395.2
See application file for complete search history.

(56) References Cited

U.S. PATENT DOCUMENTS

| | | | | |
|---|---|---|---|---|
| 5,737,328 A | * | 4/1998 | Norman | .................. H04L 45/34 370/331 |
| 6,785,678 B2 | | 8/2004 | Price | |
| 7,200,397 B1 | * | 4/2007 | Jones | ..................... H04W 48/16 370/331 |

(Continued)

FOREIGN PATENT DOCUMENTS

| | | |
|---|---|---|
| JP | 2006505224 A | 2/2006 |
| KR | 20060108582 A | 10/2006 |

(Continued)

OTHER PUBLICATIONS

Brain et al.,"An Experimental Study of Insider Attacks For OSPF Routing Protocol", IEEE, Brain Vetter et al., 1997.

(Continued)

*Primary Examiner* — Gregory B Sefcheck
*Assistant Examiner* — Majid Esmaeilian
(74) *Attorney, Agent, or Firm* — Muncy, Geissler, Olds & Lowe, P.C.

(57) ABSTRACT

Transmission by a first node may be controlled based on a status of a second node. The status of the second node may indicate, for example, whether the second node will be communicating with the first node. Thus, if it is determined based on the status of the second node that the second node may not be communicating with the first node, transmissions by the first node may be temporarily disabled until there is a change in status, and vice versa.

73 Claims, 16 Drawing Sheets

(56) References Cited

U.S. PATENT DOCUMENTS

| | | | | |
|---|---|---|---|---|
| 7,483,373 | B2* | 1/2009 | Willey | H04W 28/10 370/231 |
| 7,606,578 | B2* | 10/2009 | Irvin | H04W 4/02 455/41.2 |
| 7,813,433 | B2* | 10/2010 | Moffatt | 375/260 |
| 2002/0086635 | A1 | 7/2002 | Tomono | |
| 2003/0114168 | A1* | 6/2003 | Shi | H04W 4/02 455/456.1 |
| 2004/0068744 | A1* | 4/2004 | Claussen | H04N 5/4401 725/81 |
| 2004/0110530 | A1 | 6/2004 | Alone et al. | |
| 2004/0157620 | A1* | 8/2004 | Nyu | H04W 4/20 455/456.1 |
| 2005/0070263 | A1* | 3/2005 | Backes | H04L 47/125 455/418 |
| 2006/0014547 | A1* | 1/2006 | Walter | H04W 12/00503 455/456.1 |
| 2007/0042799 | A1* | 2/2007 | Jubin | H04W 52/244 455/522 |
| 2007/0097379 | A1 | 5/2007 | Liao et al. | |
| 2007/0097939 | A1* | 5/2007 | Nylander et al. | 370/338 |
| 2007/0183427 | A1* | 8/2007 | Nylander et al. | 370/395.2 |
| 2007/0191068 | A1* | 8/2007 | Ochi | H01Q 3/04 455/562.1 |
| 2007/0201439 | A1* | 8/2007 | Sun | H04L 47/10 370/352 |
| 2008/0057912 | A1* | 3/2008 | Deprun | H04W 48/10 455/413 |
| 2008/0144493 | A1* | 6/2008 | Yeh | H04W 52/50 370/230 |
| 2008/0220779 | A1* | 9/2008 | Bose | H04W 36/0061 455/436 |
| 2009/0034440 | A1* | 2/2009 | Samar | H04L 63/20 370/310 |
| 2009/0093252 | A1* | 4/2009 | Czaja | H04W 52/343 455/436 |
| 2009/0325583 | A1* | 12/2009 | Burgess | H04W 48/16 455/444 |
| 2010/0234039 | A1* | 9/2010 | Kwon | H04W 52/244 455/452.2 |
| 2011/0143778 | A1* | 6/2011 | Hwang | G01S 5/0221 455/456.3 |

FOREIGN PATENT DOCUMENTS

| | | |
|---|---|---|
| RU | 2198468 C2 | 2/2003 |
| WO | 0062574 A2 | 10/2000 |
| WO | WO2004054153 A2 | 6/2004 |
| WO | WO2005065214 A2 | 7/2005 |
| WO | WO-2007040449 A1 | 4/2007 |
| WO | WO2007064822 A2 | 6/2007 |
| WO | WO-2008022241 | 2/2008 |
| WO | WO2008066928 A2 | 6/2008 |

OTHER PUBLICATIONS

International Search Report and Written Opinion—PCT/US2008/078794, International Search Authority—European Patent Office—dated Mar. 1, 2010.

Siemens AG et al., "A method for interference control and power saving for home access point" ip.com Journal, ip.com Inc., West Henrietta. NY, US, Dec. 13, 2007 (Dec. 13, 2007), XP013122942 ISSN: 1533-0001 the whole document.

Taiwan Search Report—TW097138768—TIPO—dated Jan. 12, 2012.

Nortel, et al., "Open and Closed Access for Home NodeBs," Aug. 2007, 3GPP TSG-RAN WG4 Meeting #44, Athens, Greece. XP50177693A.

Huawei, "HNB Interference reduction", 3GPP TSG RAN2 #59, R2-073163, Aug. 20, 2007.

* cited by examiner

CONTROL OF WIRELESS TRANSMISSION BASED ON NODE STATUS

CLAIM OF PRIORITY UNDER 35 U.S.C. § 119

This application claims the benefit of and priority to commonly owned U.S. Provisional Patent Application No. 60/978,347, filed Oct. 8, 2007, and U.S. Provisional Patent Application No. 60/978,351, filed Oct. 8, 2007, the disclosure of each of which is hereby incorporated by reference herein.

BACKGROUND

Field

This application relates generally to wireless communication and more specifically, but not exclusively, to improving communication performance and energy conservation.

Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem.

Since radio frequency ("RF") coverage of small-coverage base stations may not be optimized by the mobile operator and deployment of such base stations may be ad-hoc, RF interference issues may arise. Thus, there is a need for improved interference management for wireless networks.

SUMMARY

A summary of sample aspects of the disclosure follows. It should be understood that any reference to the term aspects herein may refer to one or more aspects of the disclosure.

The disclosure relates in some aspect to controlling transmission of a first node based on a status of a second node. For example, in some aspects transmission by an access point may be enabled or disabled (e.g., activated or deactivated) based on a status of an access terminal that is authorized to access the access point.

In some aspects the status of the second node may indicate whether the second node will be communicating with the first node. For example, in some cases the status may relate to a location of the second node (e.g., with respect to the location of the first node), whether the second node has been powered on or is being powered off, the operating frequency of the second node (e.g., as compared to the operating frequency of the first node), and whether the second node is currently registered.

If it is determined based on the status of the second node that the second node may not be communicating with the first node (e.g., in the near term), transmissions by the first node may be temporarily disabled until there is a change in status. As an example, the first node may be configured to not transmit over one or more channels if the second node is beyond the coverage area of the first node (e.g., the distance between the first and second nodes is greater than a specified distance). Conversely, if the second node moves closer to the first node, the first node may be configured to transmit over the channel or channels.

BRIEF DESCRIPTION OF THE DRAWINGS

These and other sample aspects of the disclosure will be described in the detailed description and the appended claims that follow, and in the accompanying drawings, wherein:

Figure 1:
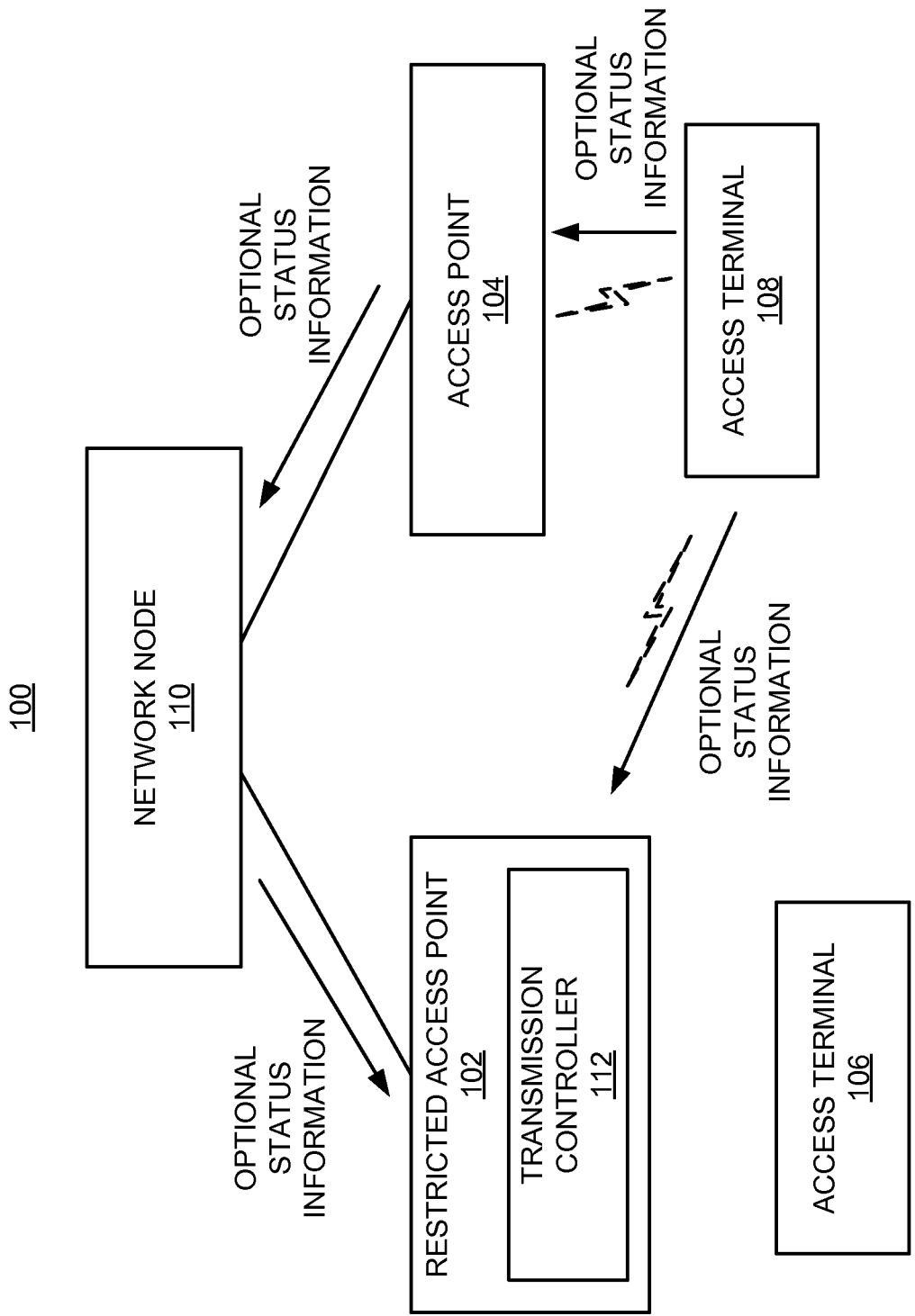
FIG. 1 is a simplified block diagram of several sample aspects of a communication system where transmissions of a node may be controlled based on status of another node.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100. For illustration purposes, various aspects of the disclosure will be described in the context of one or more network nodes, access points, and access terminals that communicate with one another. It should be appreciated, however, that the teachings herein may be applicable to other types of apparatuses or other similar apparatuses that are referenced using other terminology.

Access points 102 and 104 in the system 100 provide one or more services (e.g., network connectivity) for one or more wireless terminals (e.g., access terminal 106 and/or 108) that may be installed within or that may roam throughout an associated geographical area. In addition, the access points 102 and 104 may communicate with one or more network nodes 110 to facilitate wide area network connectivity. Such a network node may take various forms. For example, a network node may comprise a mobility manager, a registration manager, or some other suitable network entity (e.g., a core network entity or a radio access network entity).

The access point 102 may be restricted in some aspects whereby the access point 102 provides certain services to a certain set of one or more access terminals but not to other access terminals. For example, the access point 102 may belong to a set of one or more access points that provide one or more services for a set of one or more access terminals (e.g. including access terminal 108). However, this set of one or more access points may not provide the at least one service to other access terminals (e.g., the access terminal 106). Similarly, other sets of at least one access point may be defined that provide service to other sets of at least one access terminal. For example, the access terminal 106 may be part of a set of access terminals that is authorized to receive service from some other restricted access points. In various implementations, each access point of a set of at least one access point (e.g., the set including the access point 102) may be restricted to not provide to other access terminals at least one of: signaling, data access, registration, or service. In such a case, when the access terminal 106 is within the coverage area of the access point 102, the access terminal 106 may receive signals (e.g., pilot/beacon signals) from the access point 102. Consequently, the signals from the access point 102 may unduly interfere with reception at the access terminal 106 when the access terminal 106 is attempting to receive signals from its serving access point (e.g., access point 104).

Moreover, in some cases an access terminal may first determine whether it is authorized to access an access point before attempting to access the access point (e.g., to avoid attempting to access an unauthorized restricted access point) while in other cases an access terminal may simply attempt to access the "best" access point in the vicinity. As an example of the latter scenario, in the event the signal strength of the signals the access terminal 106 receives from the access point 102 is stronger than the signal strength of the signals the access terminal 106 receives from the serving access point 104, the access terminal 106 may attempt a handover from the access point 104 to the access point 102 (e.g., in accordance with standard handover procedures). This attempted handover will fail, however, because the access terminal 106 is not authorized to access the access point 102. In the event there are a relatively large number of restricted access points throughout the coverage area of a macro access point, an access terminal that is not authorized to access these restricted access points may repeatedly attempt to access the restricted access points as it roams through the macro coverage area. As a result, such an access terminal may waste a relatively large amount of battery power while attempting these futile handovers.

As illustrated in FIG. 1, the access point 102 may include a transmission controller 112 that controls transmission by the access point 102 to, for example, mitigate issues such as those described above. In some aspects, a decision to enable or disable transmission may be based on status of one or more access terminals (e.g., the access terminal 108) that are authorized to access the access point 102. For example, if the current status of the access terminal 108 indicates that it will not be communicating with the access point 102, the transmission controller 112 may disable transmissions by the access point 102 (e.g., the access point 102 will stop advertising its presence to neighboring nodes). Conversely, if the current status of the access terminal 108 indicates that it will be communicating with the access point 102, the transmission controller 112 may enable transmissions by the access point 102 (e.g., the access point 102 will advertise its presence to neighboring nodes). Here, enabling transmissions may involve, for example, re-enabling transmissions or allowing transmissions to continue. As will be discussed in more detail below, status information may be provided to the access point 102 in a variety of ways (e.g., as indicated by the arrows in FIG. 1).

An overview of sample operations of a system such as the system 100 will be described in conjunction with the flowchart of FIG. 2. For convenience, the operations of FIG. 2 (or any other operations discussed or taught herein) may be described as being performed by specific components (e.g., components of the system 100 and/or components of a system 300 as shown in FIG. 3). It should be appreciated, however, that these operations may be performed by other types of components and may be performed using a different number of components. It also should be appreciated that one or more of the operations described herein may not be employed in a given implementation.

FIG. 3 illustrates several sample components that may be incorporated into the network node 110 (e.g., a mobility manager), the access point 102, and the access terminal 108 in accordance with the teachings herein. It should be appreciated that the components illustrated for a given one of these nodes also may be incorporated into other nodes in the system 100. For example, in some implementations an access point (e.g., access point 104) that is currently serving the access terminal 108 may perform status-related operations as described herein.

The network node 110, the access point 102, and the access terminal 108 include transceivers 302, 304, and 306, respectively, for communicating with each other and with other nodes. The transceiver 302 includes a transmitter 308 for sending signals (e.g., messages) and a receiver 310 for receiving signals. The transceiver 304 includes one or more transmitters 312 for transmitting signals and one or more receivers 314 for receiving signals. The transceiver 306 includes one or more transmitters 316 for transmitting signals and one or more receivers 318 for receiving signals.

As discussed below, in some implementations a given node may have multiple transceiver components (e.g., multiple radio components) that employ different technologies and/or that operate at different frequencies. For example, the access terminal 108 may communicate with the access point 104 or the access terminal 102 via cellular technology. To this end, the access terminal 108 may have a set of cellular radio components (e.g., as represented by one pair of transmitter 316 and receiver 318) and the access point 102 may have a set of cellular radio components (e.g., as represented by one pair of transmitter 312 and receiver 314). In addition, the access terminal 108 may communicate with the access terminal 102 via a different technology (e.g., Wi-Fi). In this case, the access terminal 108 may have a set of Wi-Fi radio components (e.g., as represented by another pair of transmitter 316 and receiver 318) and the access point 102 may have a set of Wi-Fi radio components (e.g., as represented by another pair of transmitter 312 and receiver 314). Alternatively, these nodes may have multiple cellular radio components whereby a given node may communicate with different nodes on different carrier frequencies.

When the access terminal 108 is being served by the access point 104, the access point 104 may communicate with the access terminal 108 via one or more wireless communication links (e.g., as represented by the dashed symbol between these devices). When the access terminal 108 is in the coverage area of the access point 102, the access point 102 may communicate with the access terminal 108 via one or more wireless communication links (e.g., as represented by the dashed symbol between these devices). The network node 110 may communicate with the access point 104 and the access point 102 via a backhaul. It should be appreciated that wireless or non-wireless (e.g., electrical or optical) links may be employed between these nodes or other nodes in various implementations. Hence, the transceivers 302, 304, and 306 may include wireless and/or non-wireless communication components.

The network node 110, the access point 102, and the access terminal 108 also include various other components that may be used in conjunction with transmission control as taught herein. For example, the network node 110, the access point 102, and the access terminal 108 may include communication controllers 320, 322, and 324, respectively, for managing communications with other nodes (e.g., sending and receiving messages/indications) and for providing other related functionality as taught herein. The access point 102 also may include a transmission controller 332 for controlling transmissions by the transceiver 304 and for providing other related functionality as taught herein. One or more of the network node 110, the access point 102, and the access terminal 108 may include status processors 326, 328, and 330, respectively, for processing (e.g., providing, defining, or manipulating) status information, providing power control-related functionality, and for providing other related functionality as taught herein. One or more of the network node 110 and the access terminal 108 may include functionality (e.g., comprising a data memory) for maintaining status information 334 and 336, respectively, for transmission control operations. For illustration purposes, both the network node 110 and the access terminal 108 are depicted in FIG. 3 as having functionality relating to status and power control. As will be described below, however, one or more of these components may not be employed in some implementations.

Figure 2:
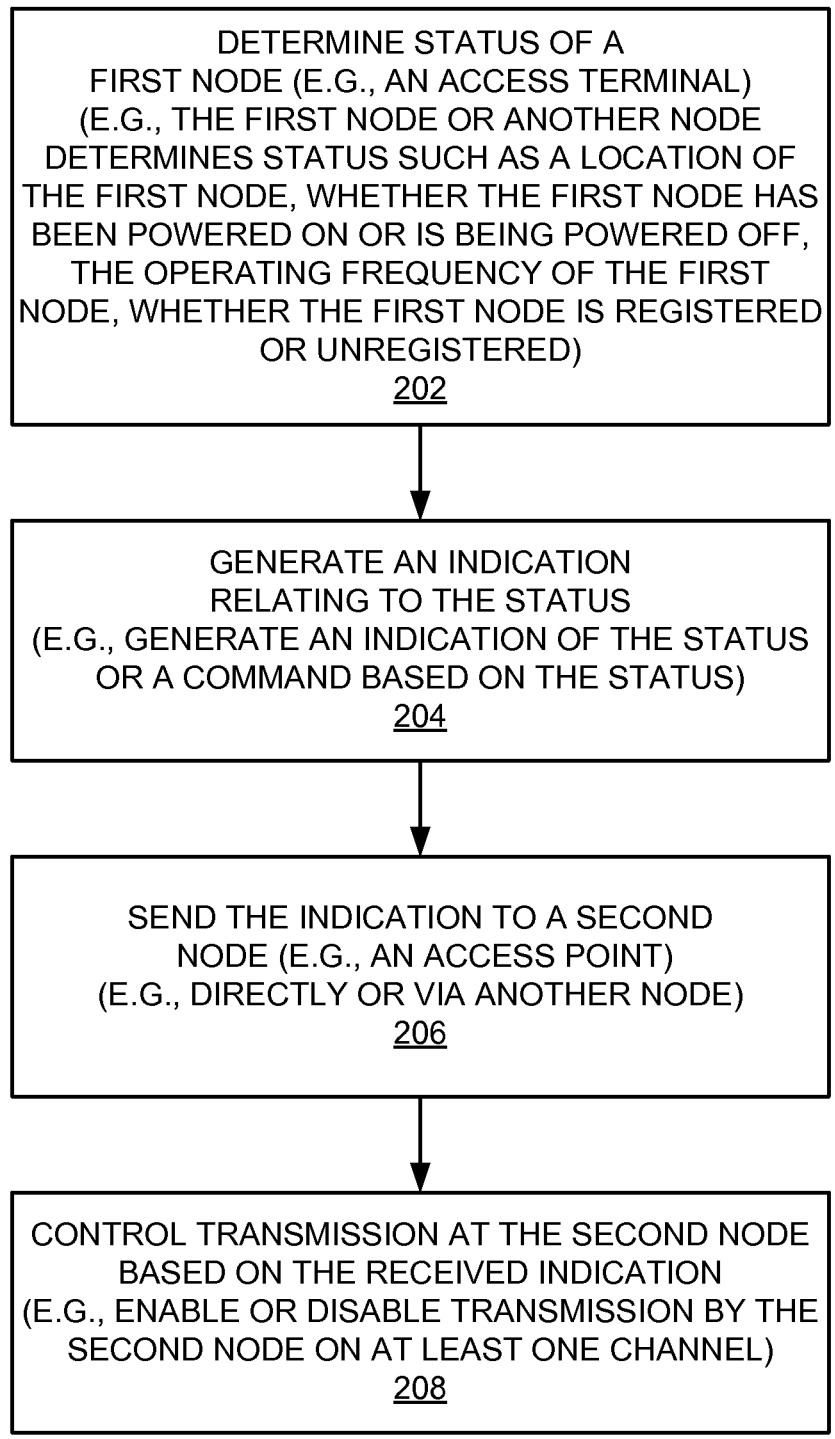
FIG. 2 is a flowchart of several sample aspects of operations that may be performed to control transmissions at a node based on status of another node.
Figure 3:
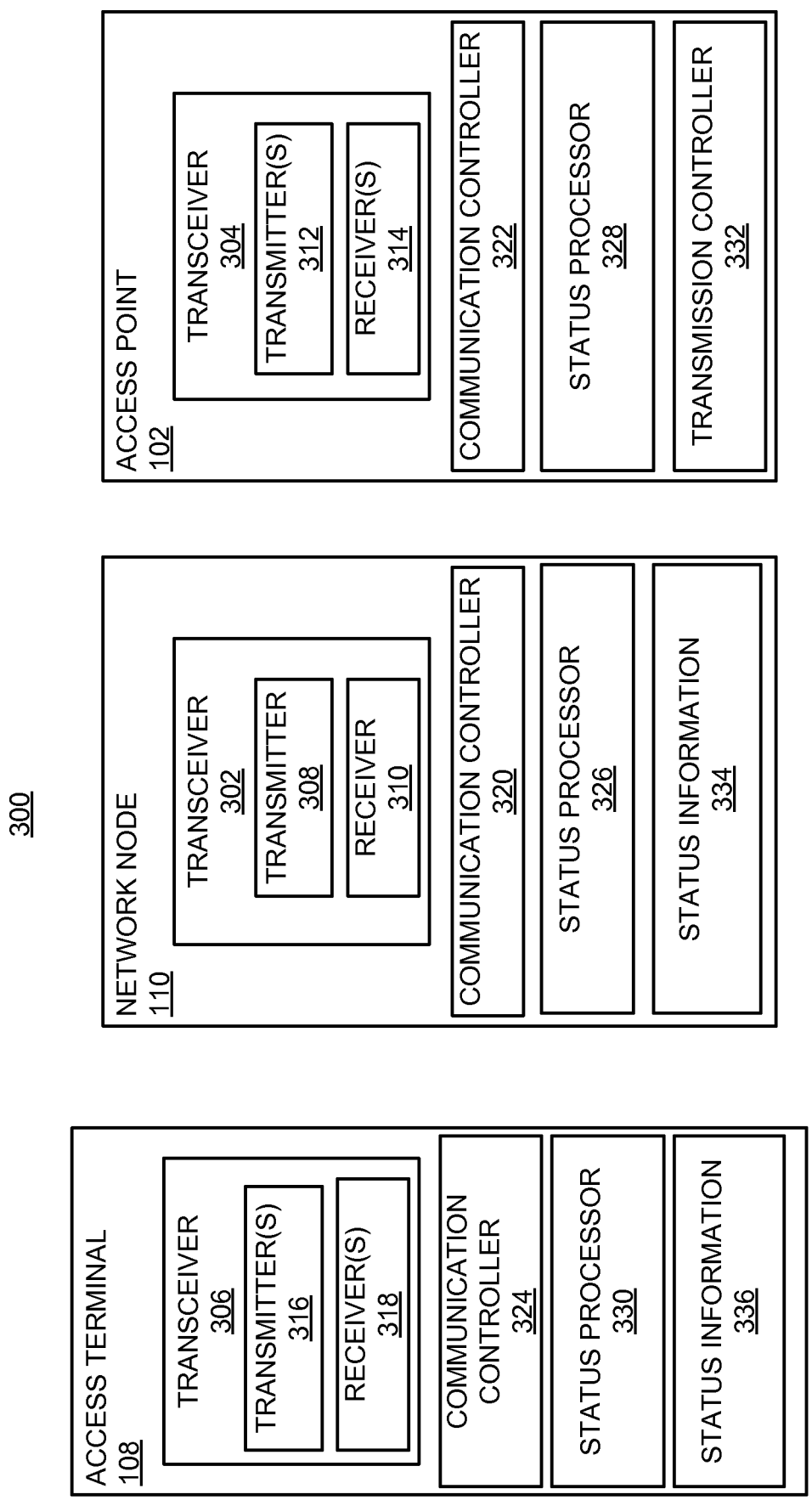
FIG. 3 is a simplified block diagram illustrating several sample aspects of components in a sample communication system.

FIG. 2 illustrates an example of how the network node 110, the access point 102, and the access terminal 108 may interact to provide transmission control. In general, one or more the techniques described by FIG. 2 may be employed in the implementations that are described in conjunction with FIGS. 4-9 below. For purposes of clarity, the descriptions of these implementations may not specifically discuss these techniques again.

As represented by block 202, the access terminal 108 (e.g., the status processor 330) and/or another node may determine status of the access terminal 108. Such an operation may be performed at various times in various implementations. For example, in some implementations status may be determined repeatedly (e.g., periodically). In some implementations a status report may be generated whenever there is a change in status.

As will be described in more detail below, in various implementations the access terminal 108 may determine its own status and use this information to control transmission by the access point 102, or the access terminal 108 may send its status information to the access point 102 to control transmission by the access point 102, or the access terminal 108 may send status information to the network node 110 (e.g., the status processor 326). In the latter case, the network node 110 (e.g., the status processor 326) may process the status information to control transmission by the access point 102 or may simply forward the status information to the access point 102.

In some implementations the network node 110 may determine the status of the access terminal 108. The network node may use this status information to control transmission by the access point 102 or may simply send this information to the access point 102.

The status of the access terminal 108 may take various forms in accordance with the teachings herein. In some aspects, the status may relate to whether the access terminal 108 (e.g., an access terminal that is authorized to access the access point 102) may communicate with the access point 102. For example, such communication may relate to whether the access terminal is currently able to communicate with the access point 102 or may communicate with the access point 102 in the near future.

In some aspects the status relates to a location of the access terminal 108. For example, if the access terminal 108 is close enough to the access point 102 to communicate with the access point 102 (or if the access terminal 108 is approaching the access point 102), transmission by the access point 102 may be enabled. Conversely, transmission may be disabled if the access terminal 108 is not close to the access point 102 (or is moving away from the access point 102). Location-based transmission control is described in more detail below in conjunction with FIG. 4.

In some aspects the status relates to whether the access terminal 108 has been powered on (e.g., recently powered on) or is being powered off. Here, in the event the access terminal 108 has been powered on, transmission by the access point 102 may be enabled. Conversely, if the access terminal 108 is being powered off, transmission by the access point 102 may be disabled.

In some aspects the status relates to an operating frequency of the access terminal 108. For example, in the event the access terminal 108 is operating on the same frequency as the access point 102, transmission by the access point 102 may be enabled. Conversely, if the access terminal 108 is not operating on the same frequency as the access point 102, transmission by the access point 102 may be disabled.

In some aspects the status relates to whether the access terminal 108 is registered (e.g., at a mobility manager). Here, in the event the access terminal 108 is registered, transmission by the access point 102 may be enabled. Conversely, if the access terminal 108 is not registered, transmission by the access point 102 may be disabled.

As represented by block 204, an indication is generated relating to the status determine at block 202. For example, as mentioned above, in some cases the access terminal 108 or the network node 110 may generate an indication representative of the status. For example, the indication may indicate the location of the access terminal 108 or of the presence or absence of the access terminal 108 in a given area (e.g., the coverage area of the access point 102). Alternatively, in some cases the access terminal 108 or the network node 110 may generate a command (e.g., a request) that attempts to control whether transmission by the access point 102 is enabled or disabled.

As represented by block 206, the indication is then sent to the access point 102. This operation may be performed at various times in various implementations. For example, the indication may be sent repeatedly (e.g., periodically) and/or whenever there is a change in status.

The indication may be sent in a direct manner or via another node. For example, in some cases the access terminal 108 may send an indication to the access point 102 via the network node 110 (as well as any other nodes that may exist in the communication path). In some cases the access terminal 108 may send an indication to the access point 102 via the access point 104 but not through the network node 110 (e.g., via a wireless communication link between the access points 102 and 104). In some cases the access terminal 108 may send an indication to the access point 102 directly (e.g., via a wireless communication link between the devices 102 and 108). In some cases, a network node 110 may send an indication it generated to the access point 102 via a suitable communication path (e.g., the backhaul).

As mentioned above, in some implementations the access point 102 and the access terminal 108 are equipped with alternative radio technology (e.g., Wi-Fi). In such an implementation, the access terminal 108 may send an indication to the access point 102 using this alternative radio technology once the access terminal 108 is sufficiently close to the access point 102.

As represented by block 208, the access point 102 may control its transmissions (e.g., transmissions by a transmitter 312) based on a received indication. In some aspects, this may involve enabling or disabling transmission on one or more channels. Such channels may comprise, for example, one or more of an overhead channel, a paging channel, an acquisition channel, or some other suitable channel. In some cases, the access point 102 may elect to receive signals while transmission is disabled (e.g., the receiver 314 may remain activated).

As mentioned above, in some aspects an indication may comprise status information or a command to control transmit power. In the former case, the access point 102 (e.g., the status processor 328) may process the received indication to determine whether to enable or disable its transmission (e.g., based on the relative proximity of the access point 102 and the access terminal 108, based on whether these devices are in different zones or cells, and so on). The status processor 328 may then cooperate with the transmission controller 332 to control transmission. If the indication comprises a command, the transmission controller 332 may simply control transmission based on the received indication.

In implementations where the access point 102 and the access terminal 108 are equipped with alternative radio technology, the access point 102 may receive signals from the access terminal 108 via the alternative radio technology. The access point 102 may therefore determine the status (e.g., location, operating state, etc.) of the access terminal 108 based on receipt of these signals.

In some implementations the access point 102 may be programmed with configuration parameters such as, for example, an electronic serial number or an international mobile subscriber identity of an access terminal, overload class parameters, or other parameters associated with an access terminal. Using these parameters, the access point 102 may predict the duration of access terminal transmissions such as registrations. The access point 102 may thus monitor for transmissions from specific access terminals. Upon detection of such a transmission, the access point 102 may deduce the proximity of the access terminal based on, for example, the received power level of the access terminal transmission.

In some aspects, a decision to control transmit power may be based on the status of more than one node. For example, if more than one access terminal is authorized to access the access point 102, transmissions by the access point 102 may be disabled only if the status of all of these access terminals indicates that none of these access terminals will be communicating with the access point 102. Conversely, transmissions by the access point 102 may be enabled if the status of any one of these access terminals indicates that at least one of these access terminals will be communicating with the access point 102. A node (e.g., the access point 102 or the network node 110) may thus receive indications relating to multiple access terminals (e.g., status information, transmit control commands, a count of the number of access terminals in the coverage area, and so on) and determine how to control transmit power at the access point 102 based on the received indications (e.g., an aggregate of these indications).

Figure 4:
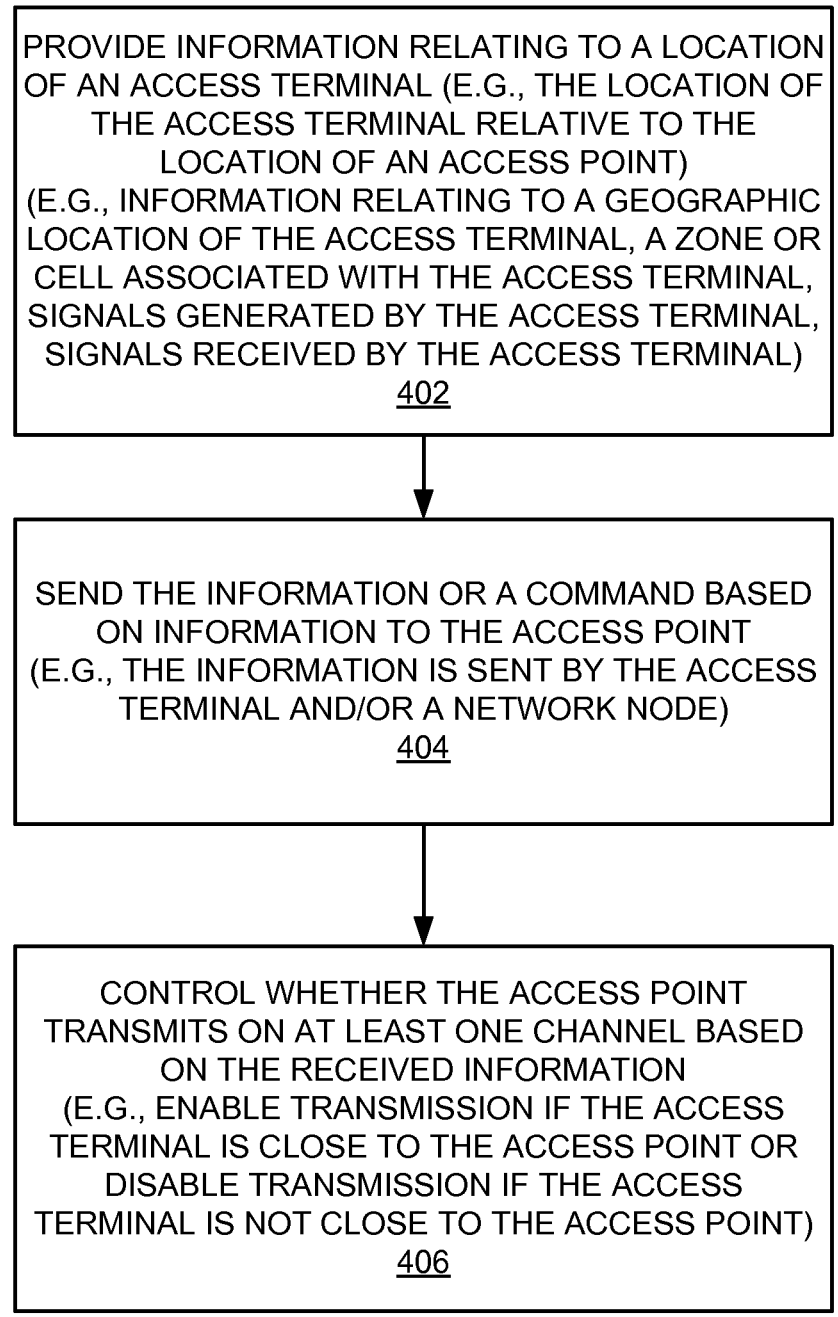
FIG. 4 is a flowchart of several sample aspects of operations that may be performed to control transmissions at an access point based on information relating to a location of an access terminal.

Referring now to FIG. 4, sample operations will now be described in the context of a system where information relating to the location of an access terminal may be used to determine whether to enable or disable transmissions by an access point. In some aspects, this location information may be used to determine whether the access terminal may be communicating with the access point in the near future. For example, such information may be used to determine whether the access terminal is within a coverage area of the access point (e.g., based on the relative proximity of the access terminal and the access point). In some cases this may involve determining the actual distance between the access terminal and the access point. In some cases this may involve estimating the relative proximity of these devices based on location-related information.

Accordingly, as represented by block 402 of FIG. 4, at various points in time a node (e.g., the access terminal 108 or the network node 110) may provide information that relates to the location of the access terminal 108. Such information may take various forms. In addition, one or more types of location-related information may be provided for use in controlling transmission at the access point 102.

In some cases this information may relate to or comprise a geographical location of the access terminal 108. To this end, the access terminal 108 (e.g., the status processor 330) or the network node 110 (e.g., the status processor 326) may comprise location determining functionality that is capable of determining or estimating a location of the access terminal 108.

In some cases location information may relate to or comprise a cell or zone at which the access terminal 108 registered. Here, the access terminal 108 (e.g., the status processor 330) may determine the cell or zone by, for example, retrieving the information from the status information 336. Similarly, the network node 110 (e.g., the status processor 326) may determine the cell or zone by, for example, receiving information from the access terminal 108 or keeping track of where the access terminal 108 has registered. For example, the network node 110 may determine a registration location of the access terminal 108 upon receiving a registration message from the access terminal.

In some cases location information may relate to or comprise signals generated by the access terminal 108. For example, the access point 102 may determine that the access terminal 108 is nearby based on RF signals the access point 102 receives from the access terminal 108 (e.g., based on the received signal strength of signals identified as coming from the access terminal 108). As a specific example, if the received signal strength at the access point 102 is greater than or equal to a threshold value, it may be deemed that the access terminal 108 is within the coverage area of the access point 102.

In some cases location information may relate to or comprise signals received by the access terminal 108. For example, the access terminal 108 may generate an indication relating to the signals it receives from other devices (e.g., neighboring access points). Here, the location of the access terminal 108 may be determined based on which access point(s) are "heard by" the access terminal 108, based on the received signal strength of the signals from the access point(s), and based on the known location(s) of the access point(s).

In implementations where the access point 102 and the access terminal 108 are equipped with alternative radio technology, the access terminal 108 may locate the access point 102 using this alternative radio technology (e.g., via a Wi-Fi search). The access terminal 108 may thus provide location information based on receipt of signals from the access point 102.

As represented by block 404, information provided at block 402 or a command based on the information is sent to the access point 102. Again, this information may be provided at various times as discussed above.

In some cases, the access terminal 108 and/or the network node 110 may simply forward the provided information to the access point 102 so that the access point 102 may determine whether to enable or disable transmission based on information. For example, the access terminal 108 may send information it provides (e.g., position coordinates, current cell or zone, etc.) directly to the access point 102 (e.g., via a transmitter 316) or may send information to the access point 102 via the network node 110. Alternatively, the network node 110 may send information it provides (e.g., position coordinates, current cell or zone, etc.) directly to the access point 102 (e.g., via the backhaul).

In some cases, the access terminal 108 or the network node 110 may process location-related information and determine, based on that information, whether to enable or disable transmission by the access point 102. Based on this determination, the access terminal 108 or the network node 110 may send a command to the access point 102 to enable or disable transmission. Such a location-based determination may be implemented in various ways.

In some cases the access terminal 108 or the network node 110 may determine the current geographical location of the access terminal 108 and compare this with the known location (e.g., geographical location) of the access point 102. The location the access point 102 may be maintained, for example, in the status information 334 or 336. Such information may take various forms such as, for example, GPS coordinates, a street address, the identity of a macro cell that has a coverage area that overlaps the location of the access point 102, and so on.

To determine the location of the access terminal 108, the access terminal 108 (e.g., the status processor 330) may comprise a location determining component such as a GPS receiver that determines location based on received GPS signals, a triangulation or trilateration (e.g., advanced forward link trilateration) processing component that determines location based on signals received from other nodes (e.g., access points) in a network, or some other suitable location determining component. Similarly, the network node 110 (e.g., the status processor 326) may include a location determining component (e.g., implementing trilateration or some other scheme) to determine the location of the access terminal 108 or receive location information from the access terminal.

In some cases a node (e.g., the access terminal 108 or the network node 110) may estimate the location of the access terminal 108 based on the current cell or zone associated with the access terminal 108. For example, the access terminal 108 may keep track of the zone or cell at which it is currently registered. In addition, the network node 110 may determine the zone or cell of the access terminal 108 based on where the access terminal 108 registered, based on a zone or cell assignment the network node 110 made, or based on information the network node 110 received regarding such an assignment. As discussed below, this cell or zone information may later be compared with a cell or zone associated with the access point 102 to determine the relative proximity of the access terminal 108 and the access point 102.

In some cases a node (e.g., the access terminal 108 or the network node 110) may estimate the actual physical location of the access terminal 108 based on the current cell or zone associated with the access terminal 108. Here, the node may determine the geographic area associated with the coverage area of the identified zone or cell. The node may then compare this information with the known geographical location of the access point 102 to determine the relative proximity of the access terminal 108 and the access point 102.

In some cases a node (e.g., the access terminal 108 or the network node 110) may estimate the location of the access terminal 108 based on measurement reports provided by the access terminal 108. Here, the measurement reports may identify, for example, neighboring access points and the received signal strength from each of these access points (e.g., a pilot strength report). The node may then determine the location of the access terminal 108 based on the known locations of the neighboring access points (e.g., as maintained in the status information 334 or 336). This location information may then be compared with the known geographical location of the access point 102 to determine the relative proximity of the access terminal 108 and the access point 102.

In some cases the access point 102 (e.g., the status processor 328) may determine whether to enable or disable its transmission based on location-related information it receives. For example, in cases where the access point 102 receives the geographic location information, the cell or zone information, the measurement reports, or other location information, the access point 102 may perform calculations similar to those described above to determine the relative proximity of the access terminal 108 and the access point 102. Also, in cases where the access point 102 receives RF signals directly from the access terminal 108, the access point 102 may process these RF signals to determine (e.g., estimate) the location of the access terminal 108. For example, the access point 102 may determine the location based on a known transmit power of the access terminal 108 and the signal strength of the signals the access point 102 receives from the access terminal 108.

As represented by block 406, transmission by the access point 102 on one or more channels is controlled based on the received location-related information. Transmission may thus be enabled (disabled), for example, if the relative proximity between the access point 102 and access terminal 108 is less (greater) than a threshold distance. Here, relative proximity for purposes of this determination may take a form of an actual distance measure or estimate, relative locations of cells or zones, received signal strength, or some other suitable form. In some cases transmission may be enabled or disabled based on whether the access terminal 108 is within a coverage area of the access point 102. In some cases transmission may be enabled or disabled based on whether the access terminal 108 is within a coverage area of a macro access point where that coverage area overlaps the location of the access point 102.

As discussed above, status-based transmit control-related operations may be performed by various nodes in a system. Several examples of such distributed processing will now be described in more detail in conjunction with FIGS. 5-9. It should be appreciated that these operations may be applicable to one or more types of status information as discussed herein. For example, in some cases the access terminal 108 may determine its location, whether it has been powered up or is powering down, its operating frequency, or whether it is registered. In addition or alternatively, in some cases the network node 110 may determine this information.

Figure 5:
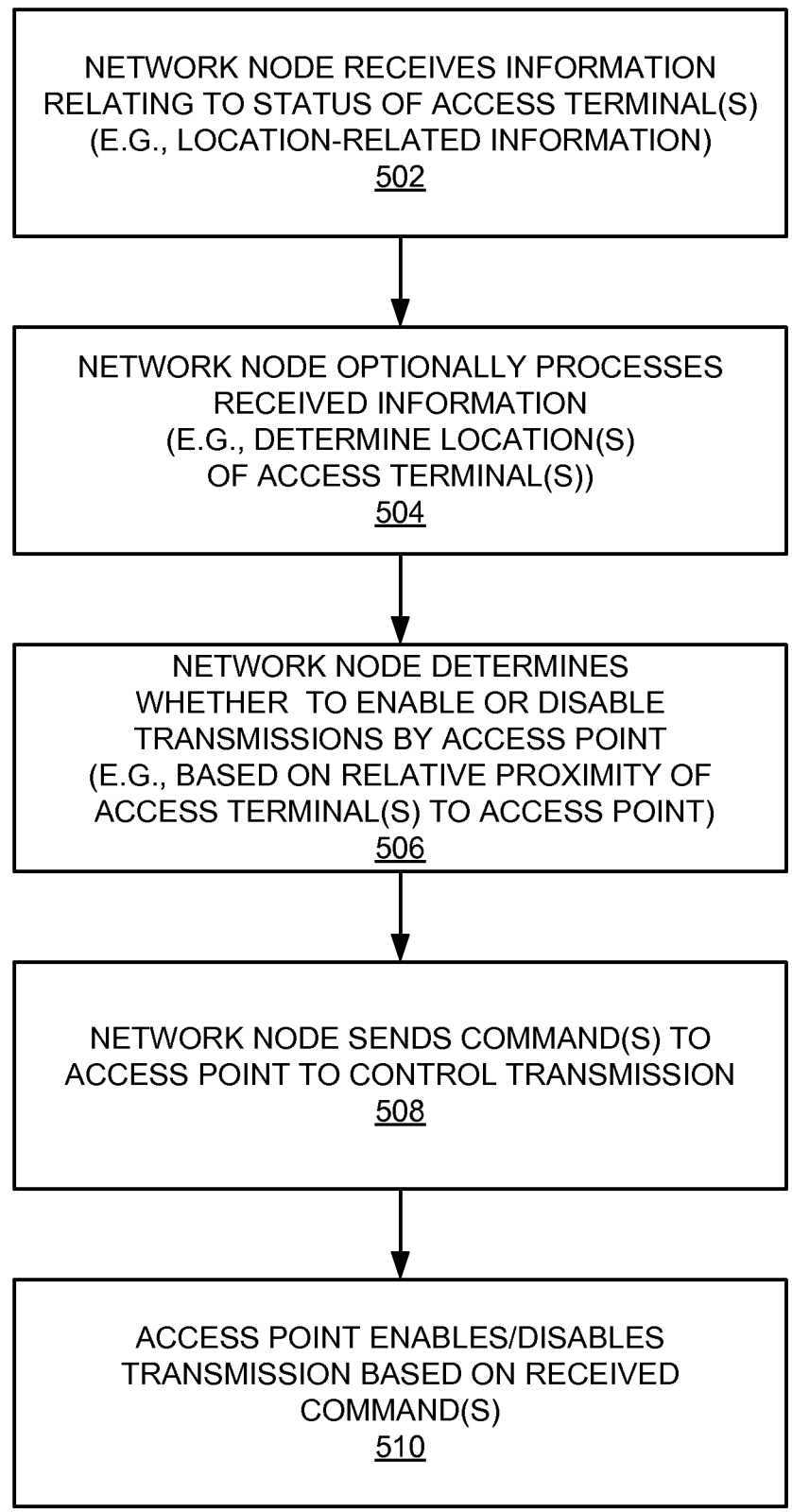
FIG. 5 is a flowchart of several sample aspects of operations that may be performed in conjunction with a network node controlling transmissions at an access point.

FIG. 5 illustrates an implementation where the network node 110 determines whether to enable or disable transmission based on information acquired by the network node 110.

As represented by block 502, the network node 110 receives information relating to the status of one or more access terminals. As mentioned above, this information may comprise status information sent by each access terminal or other information that the network node 110 may use to determine the status of each access terminal. In some cases, this information may be received in the form of a registration message from an access terminal.

As represented by block 504 the network node 110 may optionally process the received information. For example, as discussed above the network node 110 may determine status (e.g., location, registration state, etc.) of an access terminal based on received information (e.g., a measurement report from an access terminal, location information from some other node, cell or zone information from an access terminal or some other node, etc.).

Also as mentioned above, in other cases the network node 110 may not process the received information but may, instead, simply use the information as is. Examples of this scenario may include cases where the received information comprises the actual location of the access terminal, whether the access terminal has been powered on or is being powered off, whether the access terminal is registered, a currently used carrier frequency of the access terminal, etc.

As represented by block 506, the network node 110 determines whether to enable or disable transmissions by the access point 102 based on the received information. For example, the status processor 326 may elect to enable or disable transmission based on one or more of the criteria described above at block 202.

The decision of block 506 may be based on status information received from one or more access terminals that are authorized to access the access point 102 as discussed above. Here, the network node 110 may make separate decisions based on the status of each access terminal authorized to access the access point 102 or the network node 110 may make a single decision (e.g., an aggregated decision) based on the status of one or more of these access terminals. As an example of the latter scenario, as discussed above a decision to disable transmission may be based on the status of all of the access terminals and a decision to enable transmissions may be based on the status of only one of the access terminals at a given point in time.

As represented by block 508, the network node 110 sends a command to the access point based on the determination at block 506. For example, the command may comprise an explicit request to disable transmission or to enable transmission. Here, the network node 110 may generate separate messages based on the status of each access terminal authorized to access the access point 102 or the network node 110 may generate a single message (e.g., an aggregate message) based on the status of one or more of the authorized access terminals.

As represented by block 510, the access point 102 (e.g., the transmission controller 332) enables or disables transmission based on the received command or commands. In a case where multiple commands are received (e.g., based on the status of multiple authorized access terminals), the access point 102 may make an ultimate transmission control decision based on one or more of these commands. For example, a decision to disable transmission may be based on whether a command to disable transmission has been received for each of the authorized access terminals.

The transmission controller 332 may control one or more transmitters 312 or the entire transceiver 304. For example, the transmission controller 332 may disable a transmitter 312, configure a transmitter 312 to a lower power state, disable clock signals to a transmitter 312, or perform some other operation that prevents transmission.

Figure 6:
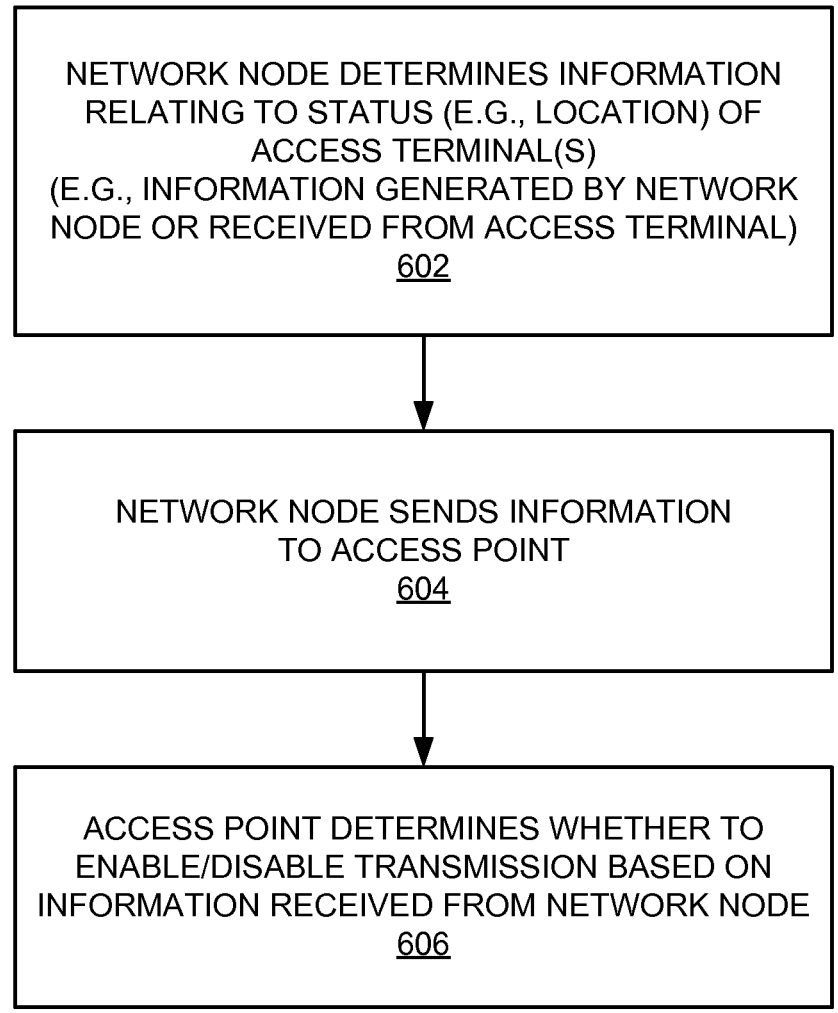
FIG. 6 is a flowchart of several sample aspects of operations that may be performed to control transmissions at an access point based on information received from a network node.

FIG. 6 illustrates an implementation where the network node 110 sends status information to the access point 102. In this case the access point 102 may determine whether to enable or disable transmission based on this information.

As represented by block 602, the network node 110 determines information relating to the status of one or more access terminals. As mentioned above this may involve generating the information at the network node 110 or receiving information from one or more access terminals.

As represented by block 604, the network node 110 sends this information to the access point 102. As mentioned above, this may be done on a repeated (e.g., periodic) basis and/or whenever there is a change in status.

As represented by block 606, the access point 102 determines whether to enable or disable transmission based on the received information. These operations may involve, for example, operations similar to those described above at blocks 506 and 510 and elsewhere in this disclosure. For example, the access point 102 may determine the relative proximity of the access terminal 108 and the access point 102, may determine whether the access terminal has been powered on or is being powered off, and so on.

Figure 7:
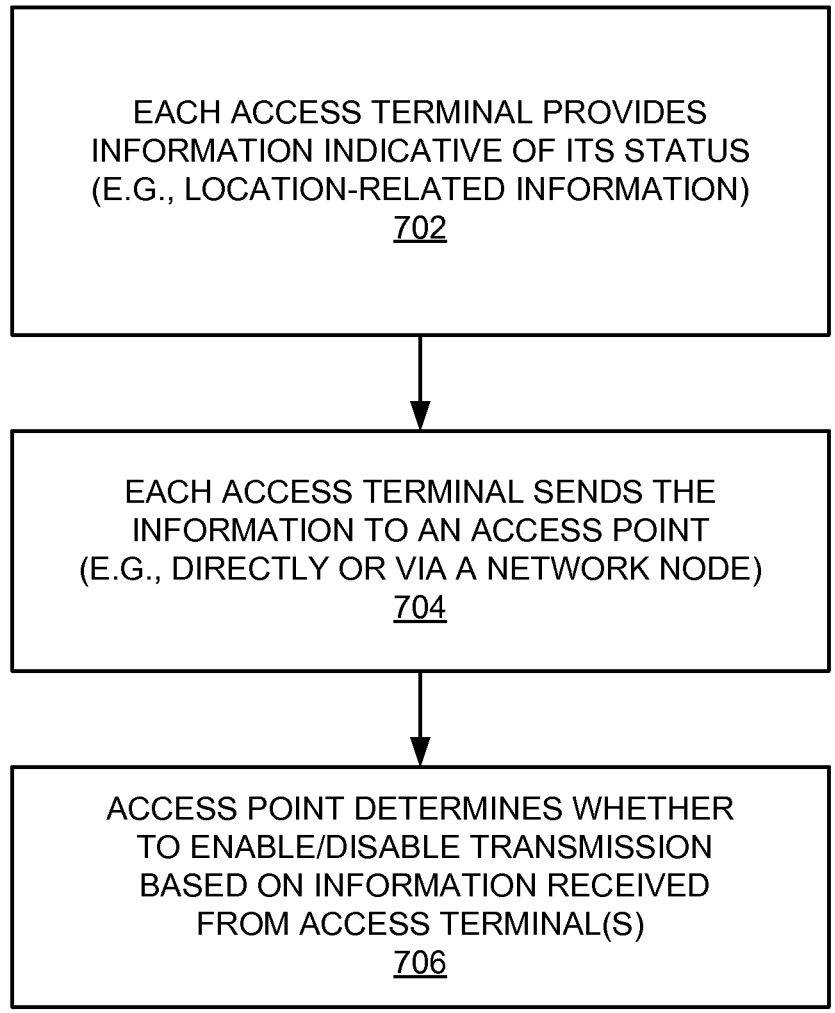
FIG. 7 is a flowchart of several sample aspects of operations that may be performed to control transmissions at an access point based on information received from a an access terminal.

FIG. 7 illustrates an implementation where each access terminal (e.g., access terminal 108) that is authorized to access the access point 102 sends status information to the access point 102. The access point may therefore determine whether to enable or disable transmission based on this information.

As represented by block 702, each access terminal provides information indicative of its own status. This may involve, for example, operations similar to those described above at blocks 202 and 402 and elsewhere in this disclosure.

As represented by block 704, each access terminal sends this information to the access point 102. As mentioned above, an access terminal may send this information directly to the access point or may send it via another node (e.g., a network node 110 or another access point 104).

As represented by block 706, the access point 102 determines whether to enable or disable transmission based on the received information. Again, this may involve operations similar to those described above.

Figure 8:
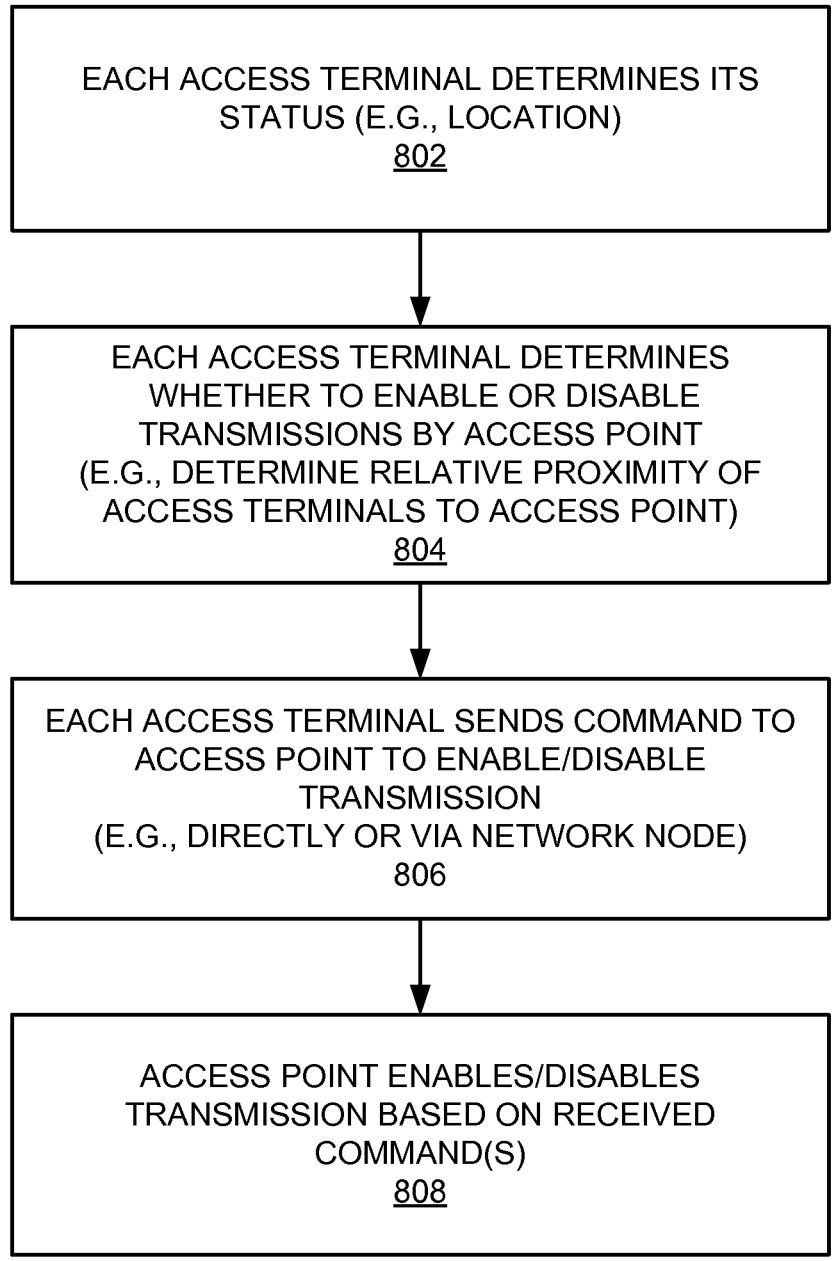
FIG. 8 is a flowchart of several sample aspects of operations that may be performed in conjunction with an access terminal controlling transmissions at an access point.

FIG. 8 illustrates an implementation where each access terminal (e.g., access terminal 108) that is authorized to access the access point 102 determines whether to enable or disable transmission at the access point 102. Here, each access terminal may make its own determination based on its own status information.

Accordingly, as represented by block 802 each access terminal determines its status. This may involve, for example, operations similar those described above at blocks 202 and 402 and elsewhere in this disclosure.

As represented by block 804, each access terminal determines whether to enable or disable transmissions by the access point 102 based on the status information. For example, the status processor 330 of the access terminal 108 may elect to enable or disable transmission based on one or more of the criteria described above at block 202.

As represented by block 806, each access terminal sends a command to the access point based on the determination at block 804. As above, this command may comprise an explicit request to disable transmission or to enable transmission.

As represented by block 808, the access point 102 enables or disables transmission based on the command or commands it receives from the access terminal(s). In a case where multiple commands are received from multiple access terminals, the access point may make an ultimate transmission control decision based on one or more of these commands. For example, a decision to disable transmission may be based on whether a command to disable transmission has been received from each of the authorized access terminals.

Figure 9:
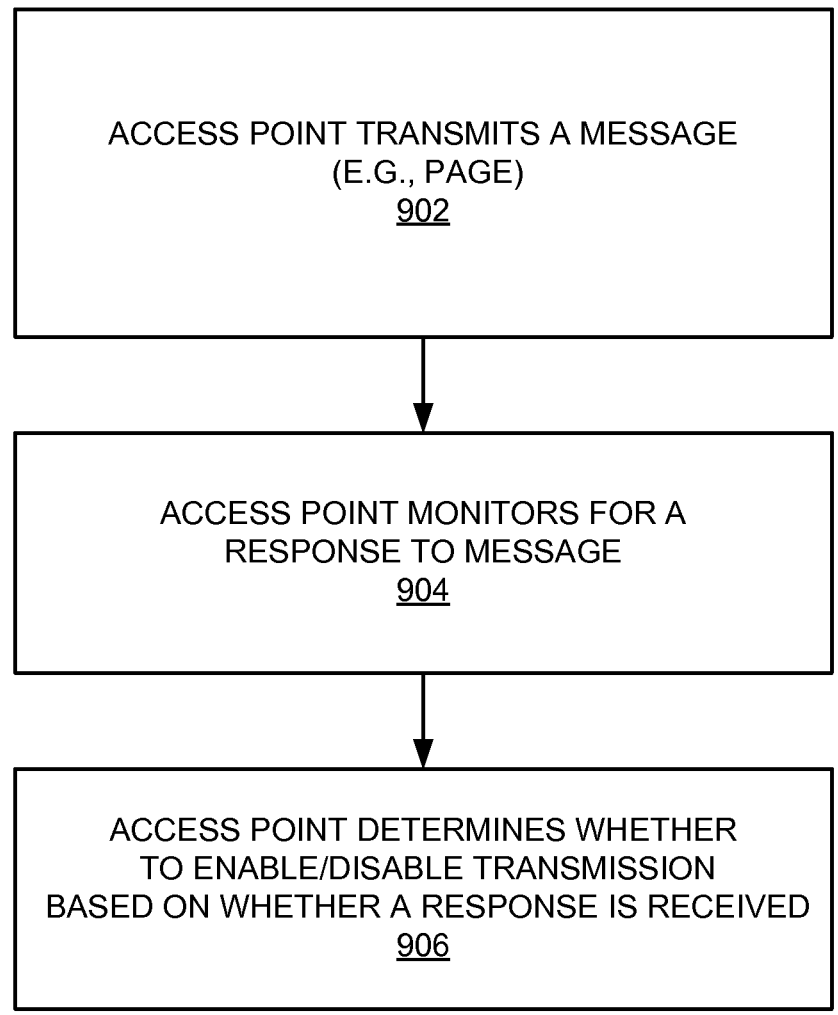
FIG. 9 is a flowchart of several sample aspects of operations that may be performed to control transmissions at an access point based on whether the access point receives a response to a message.

FIG. 9 illustrates an example where the access point 102 determines whether to enable or disable transmission based on whether it receives a response to a message.

As represented by block 902 the access point 102 transmits a message that may be received by neighboring nodes. For example, the communication controller 322 may broadcast pages on a specified channel. In some cases such a page may be directed to a specific node or nodes while in other cases the page may not be directed to a specific node or nodes, for example a broadcast page.

As represented by block 904 the access point 102 monitors for a response to the message. For example, if an access terminal (e.g., access terminal 108) that is authorized to access the access point 102 is close enough to the access point 102 to receive the page, the access terminal may respond to the page.

As represented by block 906, the access point 102 determines whether to enable or disable transmission based on whether a response is received. For example, if no response is received the access point 102 may determine that no active authorized access terminals are in the vicinity (e.g., thereby determining status of the access terminals). In this case, the access point 102 may disable transmission on a designated channel or channels. Conversely, if a response is received, the access point 102 may continue transmitting on the designated channel(s).

Figure 10:
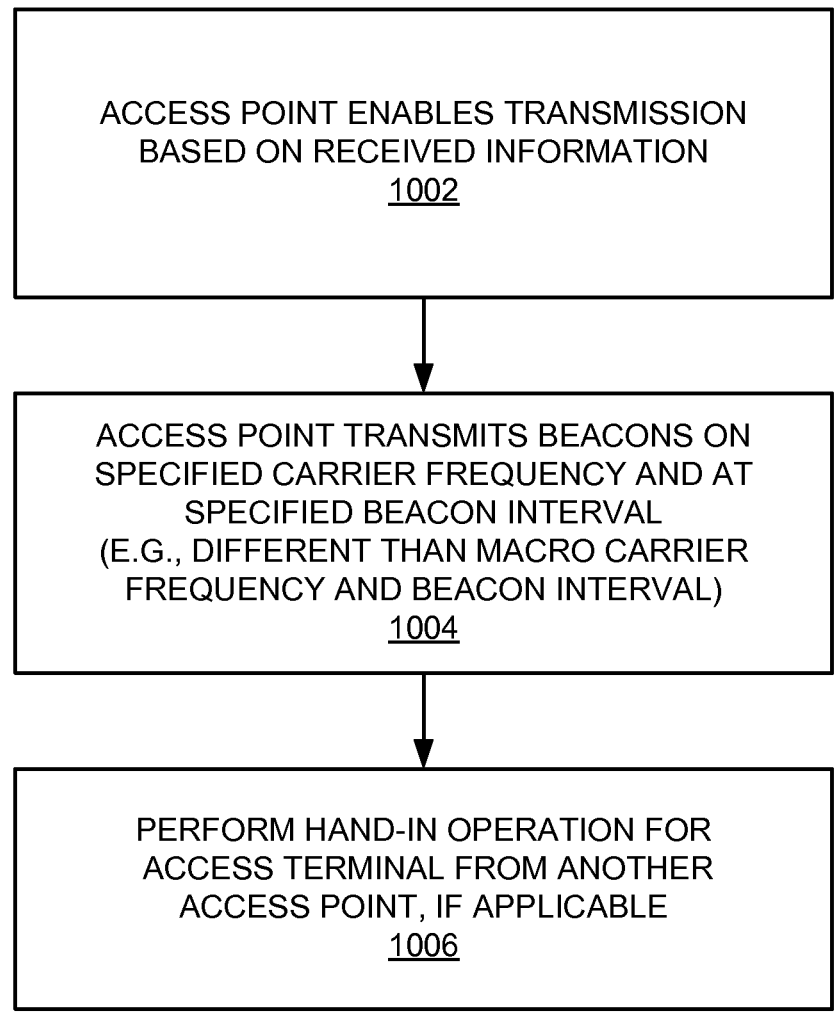
FIG. 10 is a flowchart of several sample aspects of operations that may be performed in conjunction with pilot transmissions and hand-in operations.

Referring now to FIG. 10, in the event the access point 102 enables transmission, the access point 102 may generate signaling in a manner that facilitates performing a hand-in operation for an access terminal (e.g., access terminal 108). Here, at block 1002 transmission on one or more channels may be enabled based on an indication that one or more authorized access terminals may communicate with the access point 102.

As represented by block 1004, the access point 102 may transmit beacons on a specified carrier frequency and at a specified beacon interval. Here, the carrier frequency and/or the beacon interval may be specified as being different than the carrier frequency and/or beacon interval used by macro access points. For example, the beacon interval used by a restricted access point may be four times as long as a beacon interval used by macro access points. In this way, an access terminal may readily distinguish between signals from macro access points and restricted access points (e.g., femto cells). Upon receiving a beacon from the access point 102, an access terminal may add the access point 102 to its active set.

In some cases an access terminal may add the access point 102 to its active set based on the location of the access terminal. For example, an access terminal may determine the relative proximity of itself and the access point 102 as discussed herein. If the access terminal determines that it is relatively close to the access point 102 (e.g., within a coverage area), the access terminal may automatically add the access point 102 to its active set.

As represented by block 1006, if applicable, the access point 102 may perform a hand-in operation so that an access terminal that was previously serviced by another access point (e.g., access point 104) may now be serviced by the access point 102.

In some aspects the teachings herein may be employed in a network that includes macro scale coverage (e.g., a large area cellular network such as a 3G networks, typically referred to as a macro cell network or a WAN) and smaller scale coverage (e.g., a residence-based or building-based network environment typically referred to as a LAN). As an access terminal ("AT") moves through such a network, the access terminal may be served in certain locations by access points that provide macro coverage while the access terminal may be served at other locations by access points that provide smaller scale coverage. In some aspects, the smaller coverage access points may be used to provide incremental capacity growth, in-building coverage, and different services (e.g., for a more robust user experience). In the discussion herein, an access point that provides coverage over a relatively large area may be referred to as a macro node. An access point that provides coverage over a relatively small area (e.g., a residence) may be referred to as a femto node. An access point that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each node may be further associated with (e.g., divided into) one or more cells or sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 11:
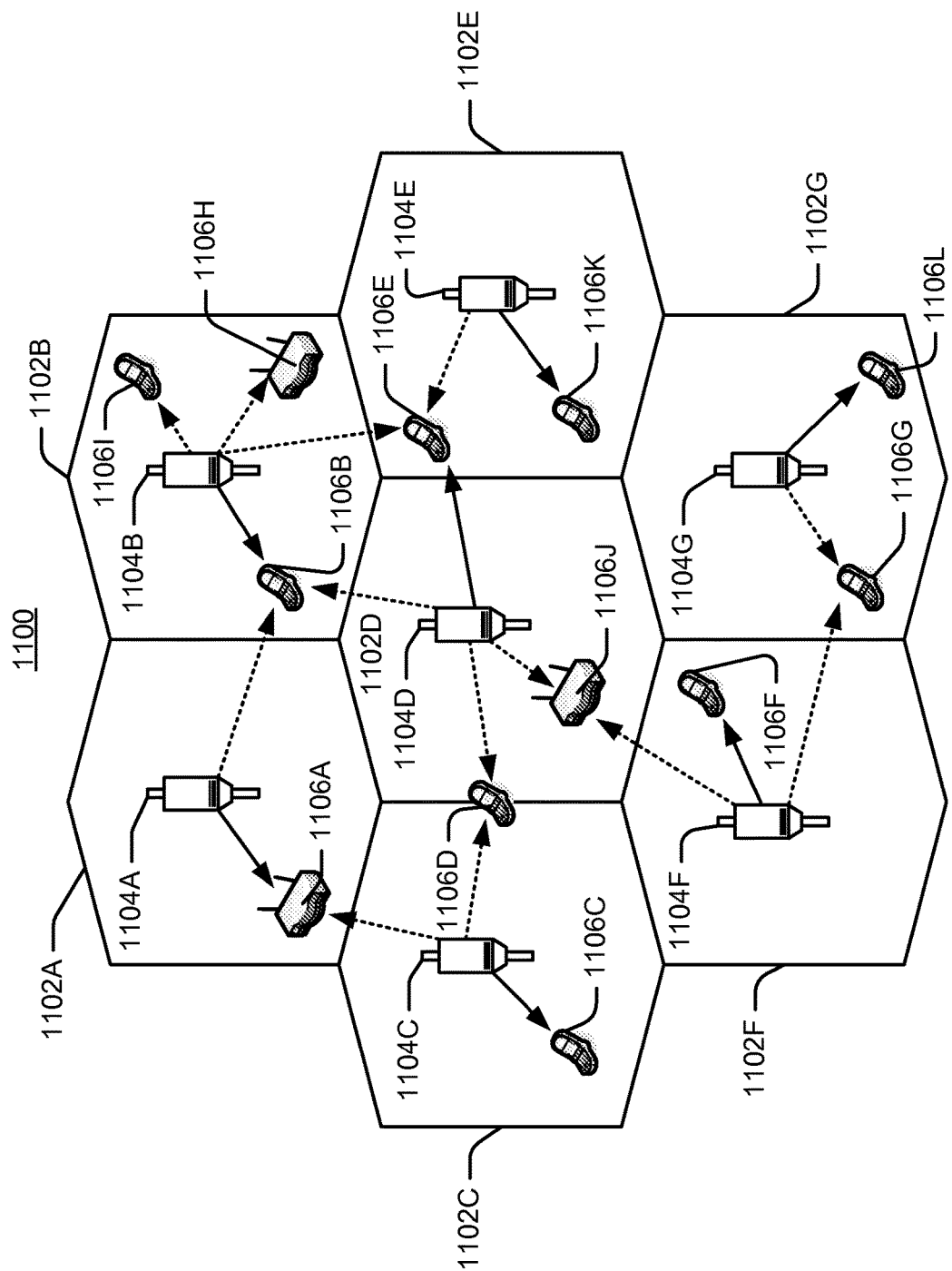
FIG. 11 is a simplified diagram of a wireless communication system.

FIG. 11 illustrates a wireless communication system 1100, configured to support a number of users, in which the teachings herein may be implemented. The system 1100 provides communication for multiple cells 1102, such as, for example, macro cells 1102A-1102G, with each cell being serviced by a corresponding access point 1104 (e.g., access points 1104A-1104G). As shown in FIG. 11, access terminals 1106 (e.g., access terminals 1106A-1106L) may be dispersed at various locations throughout the system over time. Each access terminal 1106 may communicate with one or more access points 1104 on a forward link ("FL") and/or a reverse link ("RL") at a given moment, depending upon whether the access terminal 1106 is active and whether it is in soft handoff, for example. The wireless communication system 1100 may provide service over a large geographic region. For example, macro cells 1102A-1102G may cover a few blocks in a neighborhood.

Figure 12:
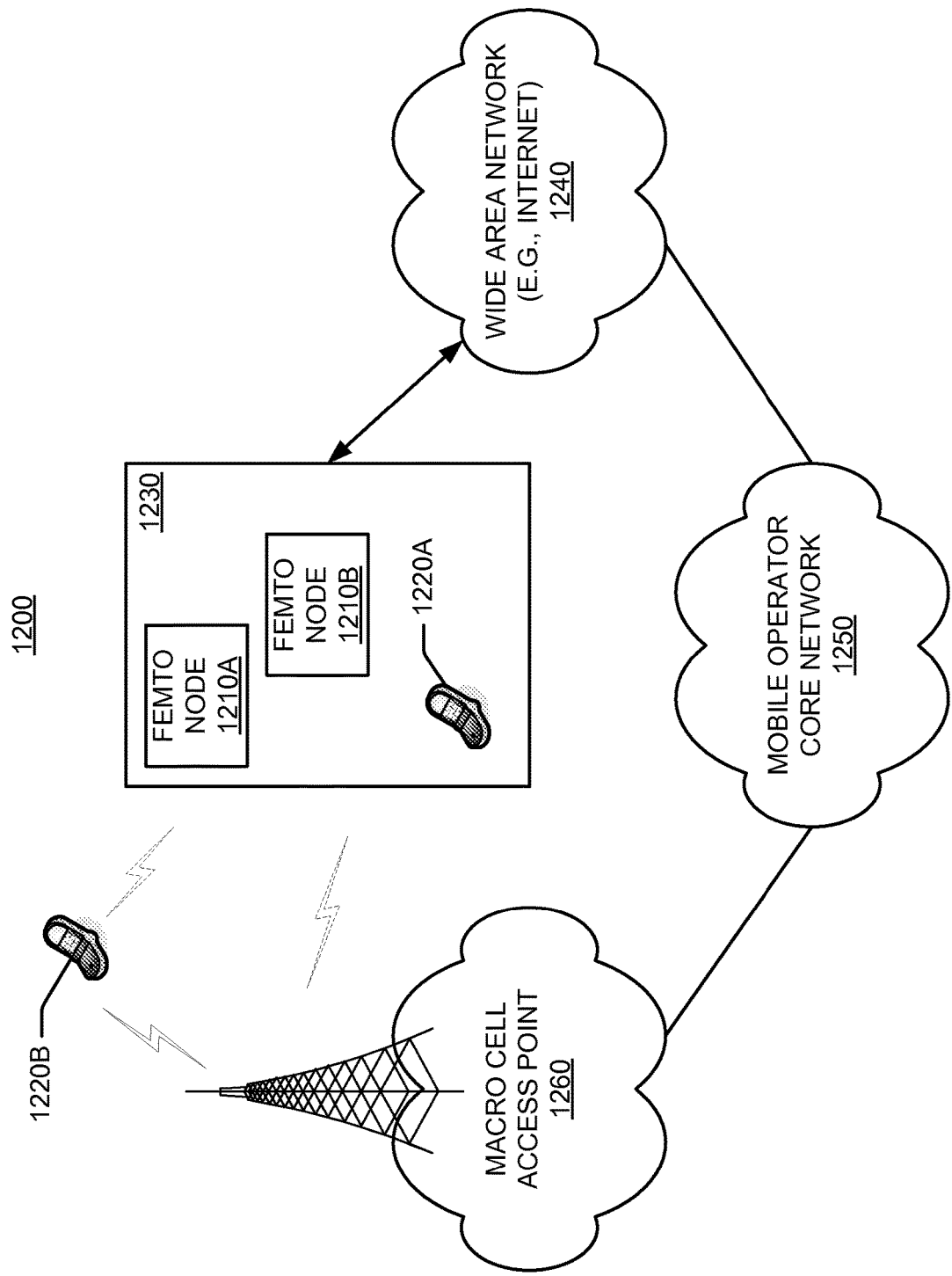
FIG. 12 is a simplified diagram of a wireless communication system including femto nodes.

FIG. 12 illustrates an exemplary communication system 1200 where one or more femto nodes are deployed within a network environment. Specifically, the system 1200 includes multiple femto nodes 1210 (e.g., femto nodes 1210A and 1210B) installed in a relatively small scale network environment (e.g., in one or more user residences 1230). Each femto node 1210 may be coupled to a wide area network 1240 (e.g., the Internet) and a mobile operator core network 1250 (e.g., comprising one or more network nodes as discussed herein) via a DSL router, a cable modem, a wireless link, or other connectivity means (not shown). As will be discussed below, each femto node 1210 may be configured to serve associated access terminals 1220 (e.g., access terminal 1220A) and, optionally, alien access terminals 1220 (e.g., access terminal 1220B). In other words, access to femto nodes 1210 may be restricted whereby a given access terminal 1220 may be served by a set of designated (e.g., home) femto node(s) 1210 but may not be served by any non-designated femto nodes 1210 (e.g., a neighbor's femto node 1210).

Figure 13:
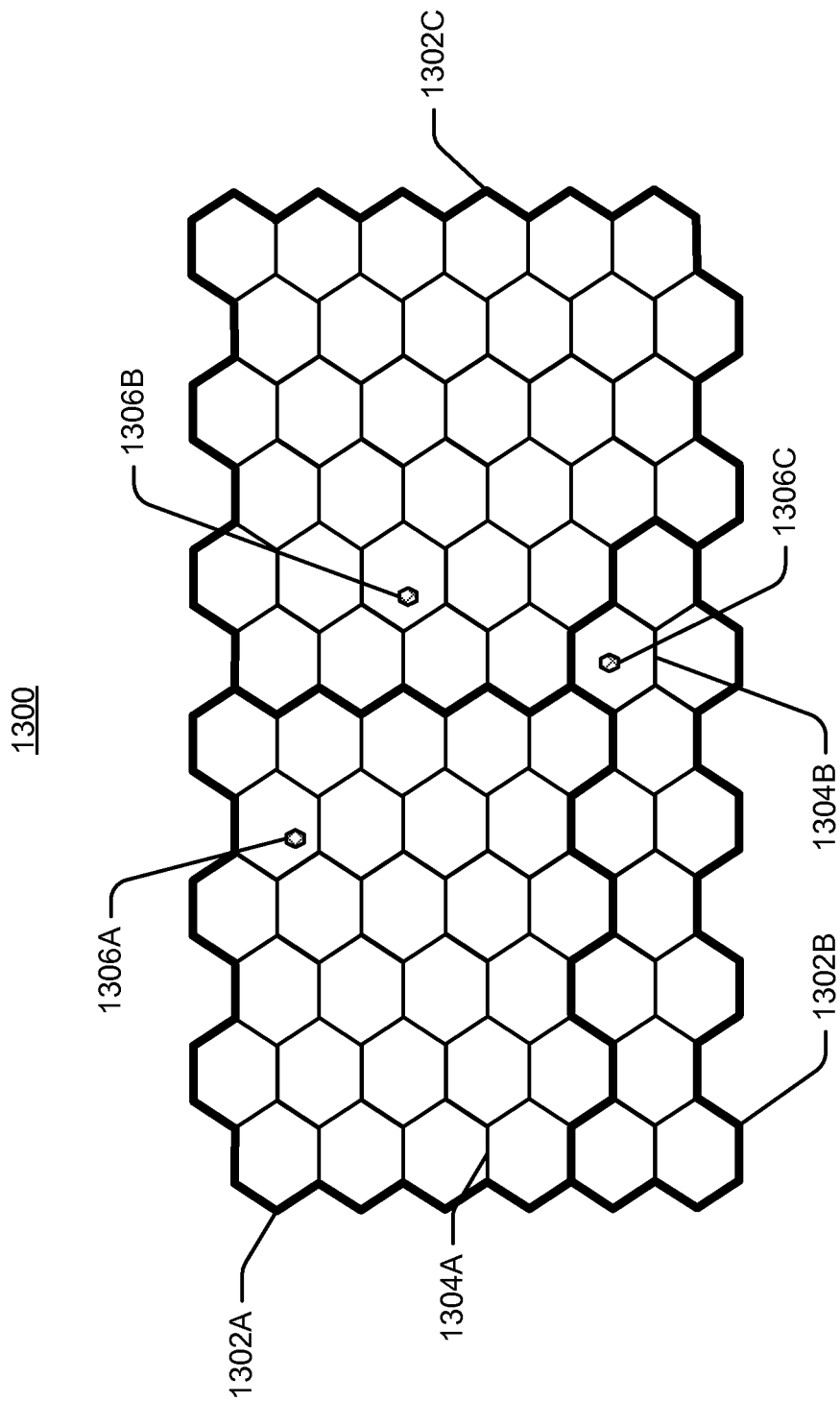
FIG. 13 is a simplified diagram illustrating coverage areas for wireless communication.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 may be defined with a given tracking area 1302 or macro coverage area 1304. Also, one or more pico coverage areas (not shown) may be defined within a given tracking area 1302 or macro coverage area 1304.

Referring again to FIG. 12, the owner of a femto node 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by an access point 1260 of the macro cell mobile network 1250 or by any one of a set of femto nodes 1210 (e.g., the femto nodes 1210A and 1210B that reside within a corresponding user residence 1230). For example, when a subscriber is outside his home, he may be served by a standard macro access point (e.g., access point 1260) and when the subscriber is at home, he is served by a femto node (e.g., node 1210A). Here, it should be appreciated that a femto node 1220 may be backward compatible with existing access terminals 1220.

A femto node 1210 may be deployed on a single frequency or, in the alternative, on multiple frequencies. Depending on the particular configuration, the single frequency or one or more of the multiple frequencies may overlap with one or more frequencies used by a macro node (e.g., access point 1260).

In some aspects, an access terminal 1220 may be configured to connect to a preferred femto node (e.g., the home femto node of the access terminal 1220) whenever such connectivity is possible. For example, whenever the access terminal 1220 is within the user's residence 1230, it may be desired that the access terminal 1220 communicate only with the home femto node 1210.

In some aspects, if the access terminal 1220 operates within the macro cellular network 1250 but is not residing on its most preferred network (e.g., as defined in a preferred roaming list), the access terminal 1220 may continue to search for the most preferred network (e.g., the preferred femto node 1210) using a Better System Reselection ("BSR"), which may involve a periodic scanning of available systems to determine whether better systems are currently available, and subsequent efforts to associate with such preferred systems. With the acquisition entry, the access terminal 1220 may limit the search for specific band and channel. For example, the search for the most preferred system may be repeated periodically. Upon discovery of a preferred femto node 1210, the access terminal 1220 selects the femto node 1210 for camping within its coverage area.

A femto node may be restricted in some aspects (e.g., as discussed). For example, a given femto node may only provide certain services to certain access terminals. In deployments with so-called restricted (or closed) association, a given access terminal may only be served by the macro cell mobile network and a defined set of femto nodes (e.g., the femto nodes 1210 that reside within the corresponding user residence 1230). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
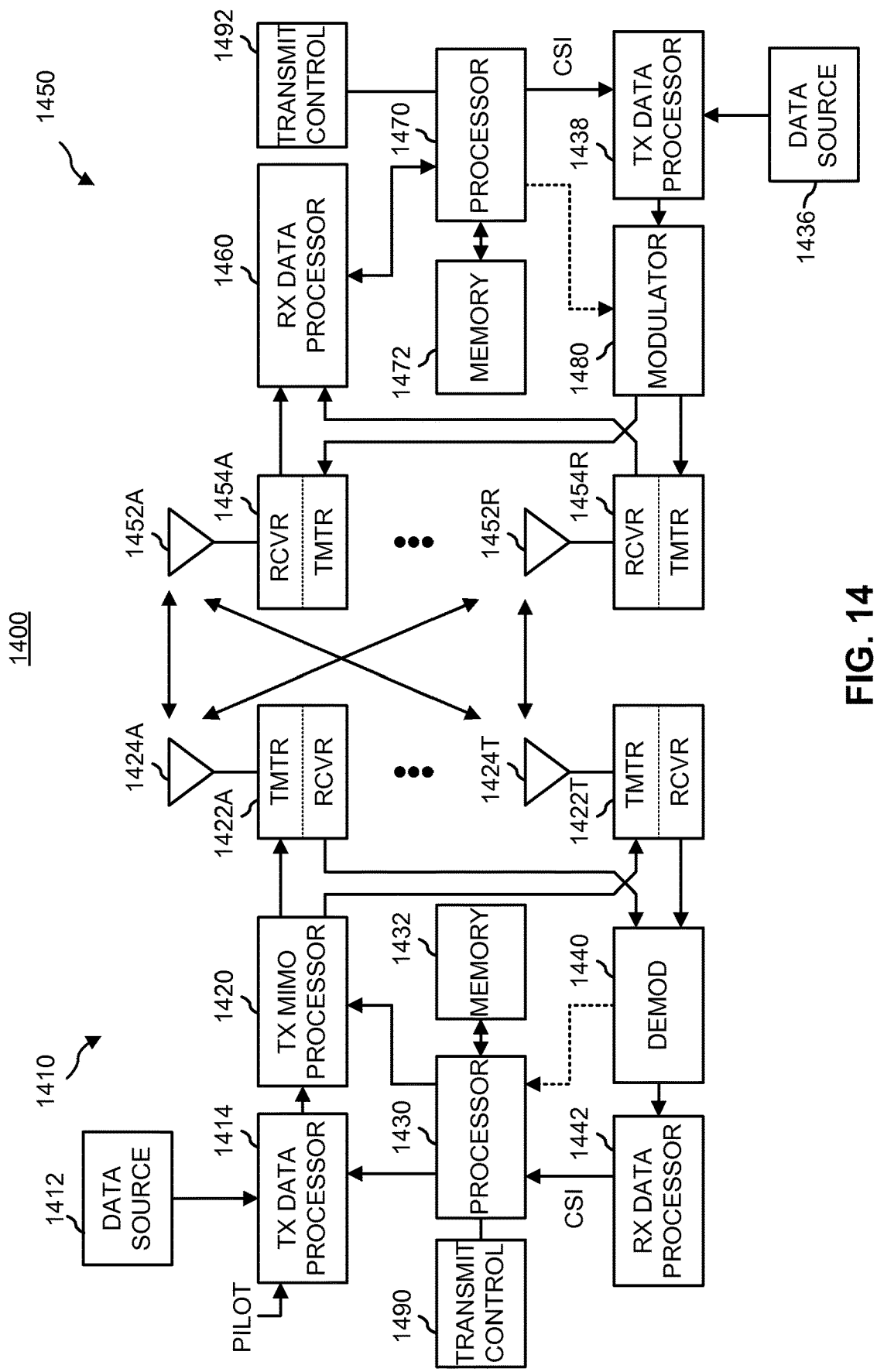
FIG. 14 is a simplified block diagram of several sample aspects of communication components.

The teachings herein may be incorporated into a node (e.g., a device) employing various components for communicating with at least one other node. FIG. 14 depicts several sample components that may be employed to facilitate communication between nodes. Specifically, FIG. 14 illustrates a wireless device 1410 (e.g., an access point) and a wireless device 1450 (e.g., an access terminal) of a MIMO system 1400. At the device 1410, traffic data for a number of data streams is provided from a data source 1412 to a transmit ("TX") data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers ("XCVR") 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver ("XCVR") 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive ("RX") data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which precoding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator ("DE-MOD") 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform status-based transmit control operations as taught herein. For example, a transmit control component 1490 may cooperate with the processor 1430 and/or other components of the device 1410 to send/receive signals to/from another device (e.g., device 1450) as taught herein. Similarly, a transmit control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the transmit control component 1490 and the processor 1430 and a single processing component may provide the functionality of the transmit control component 1492 and the processor 1470.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1×RTT, 1×EV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 15:
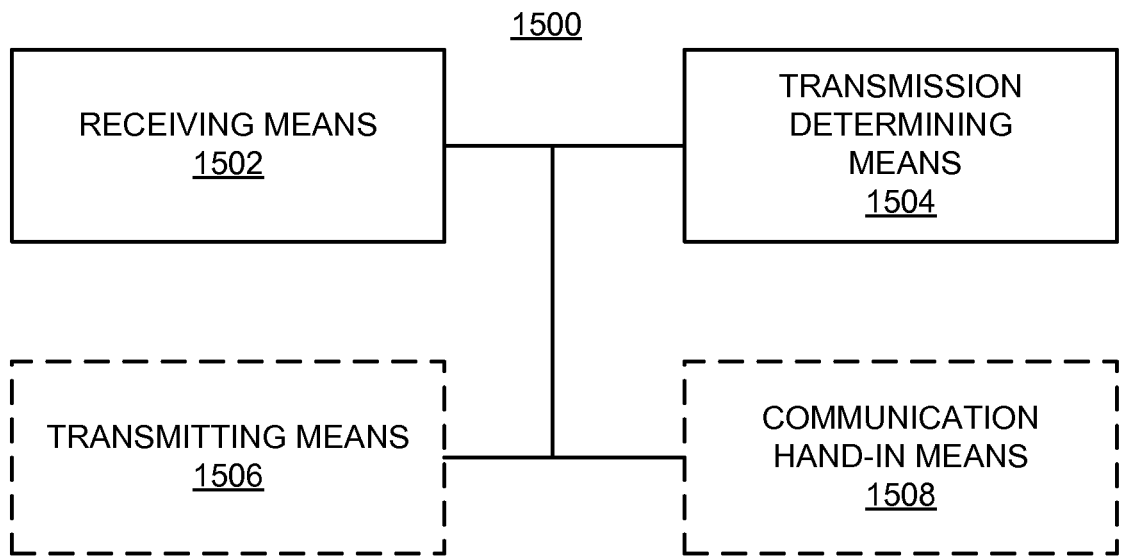
FIGS. 15-17 are simplified block diagrams of several sample aspects of apparatuses configured to control transmit power based on node status as taught herein.
Figure 16:
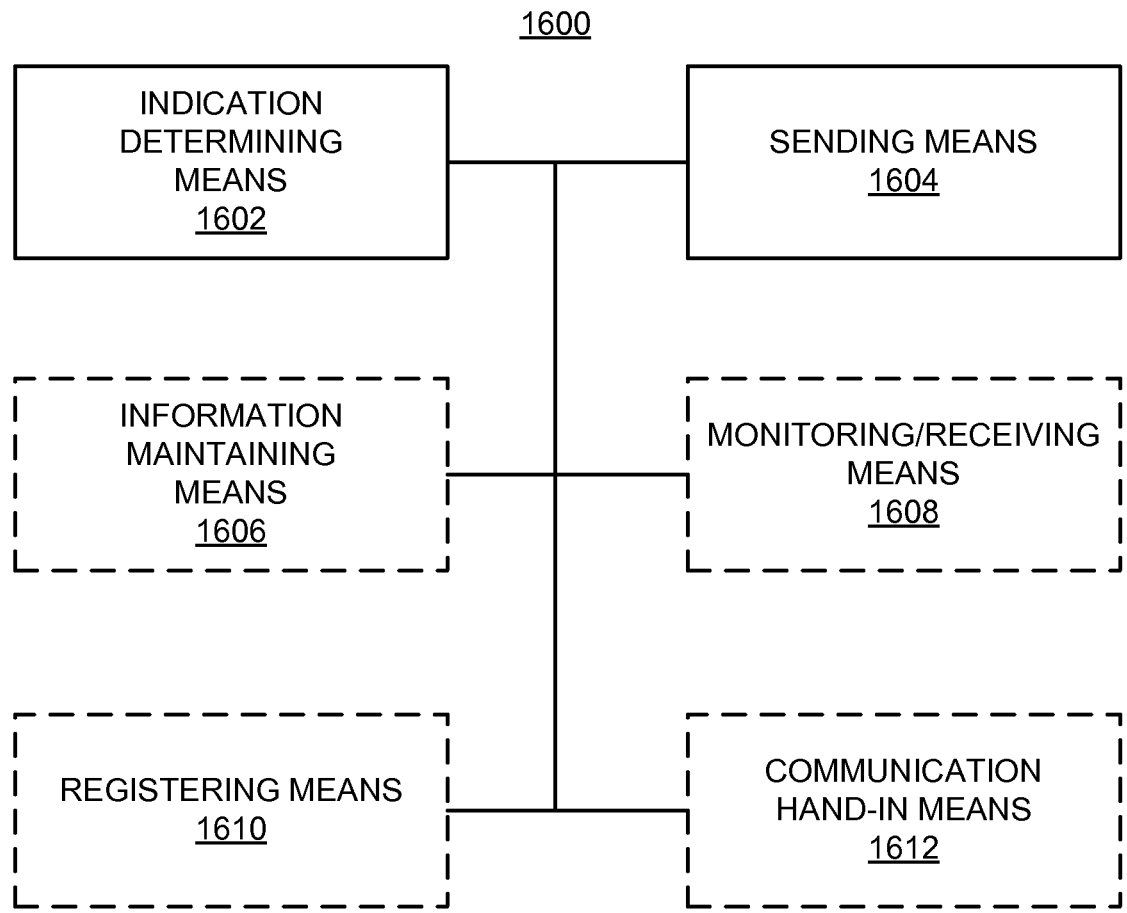
Figure 17:
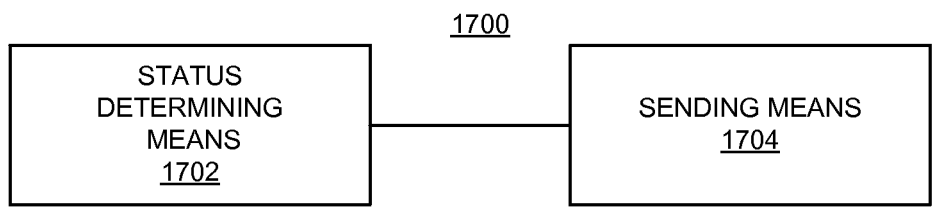

The components described herein may be implemented in a variety of ways. Referring to FIGS. 15-17, apparatuses 1500, 1600, and 1700 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 15-17 are optional.

The apparatuses 1500, 1600, and 1700 may include one or more modules that may perform one or more of the functions described above with regard to various figures. For example, a receiving means 1502 may correspond to, for example, a communication controller 328 as discussed herein. A transmission determining means 1504 may correspond to, for example, a status processor as discussed herein. A transmitting means 1506 may correspond to, for example, a communication controller 328 as discussed herein. A communication hand-in means 1508 may correspond to, for example, a communication controller 328 as discussed herein. An indication determining means 1602 may correspond to, for example, a status processor 336 as discussed herein. A sending means 1604 may correspond to, for example, a communication controller 330 as discussed herein. An information maintaining means 1606 may correspond to, for example, status information component 324 as discussed herein. A monitoring/receiving means 1608 may correspond to, for example, a communication controller 330 as discussed herein. A registering means 1610 may correspond to, for example, a communication controller 330 as discussed herein. A communication hand-in means 1612 may correspond to, for example, a communication controller 330 as discussed herein. A status determining means 1702 may correspond to, for example, a status processor 332 as discussed herein. A sending means 1704 may correspond to, for example, a communication controller 326 as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

In view of the above, in some aspects a first method of communication comprises: receiving, at a first node, information indicative of status of a second node; and determining, based on the information, whether to allow the first node to transmit on at least one channel. In addition, in some aspects at least one of the following also may apply to the first method of communication: the status is indicative of whether the second node may attempt to communicate with the first node; the status indicates at least one of the group consisting of: that the second node has recently been powered on, that the second node will be powered off, a carrier frequency used by the second node, whether the second node is registered, and a location of the first node; the status is indicative of a location of the second node; the information indicates a relative proximity of the first and second nodes; the information indicates a zone or cell at which the second node is registered; the information comprises a measurement report from the second node, or the information indicates whether the second node is receiving signals from the first node; the determination comprises determining whether the second node is within a coverage area of the first node; the determination comprises allowing the first node to transmit on the at least one channel if the location of the second node is less than a defined distance away from a location associated with the first node; the determination comprises not allowing the first node to transmit on the at least one channel if the location of the second node is greater than a defined distance away from a location associated with the first node; the information comprises a wireless signal transmitted by the second node, whereby receipt of the wireless signal by the first node is indicative of a relative proximity of the first and second nodes; the determination comprises determining the relative proximity based on a received signal strength associated with the wireless signal; the second node is authorized to access the first node, at least one other node is authorized to access the first node, and the determination is further based on information indicative of at least one status of the at least one other node; the information is received from a network mobility manager or the second node; the method further comprises sending a page, wherein the information comprises a response to the page; the page is directed to the second node; the at least one channel is associated with a first type of radio technology or a first carrier frequency and the information is received via a second type of radio technology or a second carrier frequency; the at least one channel comprises at least one of the group consisting of: an overhead channel, a paging channel, and an acquisition channel; the second node is registered at a third node when the second node is at the location, the third node transmits beacons via a first carrier associated with a first nominal carrier frequency, and the method further comprises: transmitting, based on the determination, beacons via a second carrier associated with a second nominal carrier frequency, receiving a response to at least one of the beacons from the second node, and performing a communication hand-in for the second node from the third node; the first node is restricted to not provide, for at least one other node, at least one of the group consisting of: signaling, data access, registration, and service; or the first node comprises a femto node or a pico node.

Also in view of the above, in some aspects a second method of communication comprises: determining, at a first node, an indication relating to status of the first node; and sending a message comprising the indication to control whether a second node transmits on at least one channel. In addition, in some aspects at least one of the following also may apply to the second method of communication: the status is indicative of whether the first node may attempt to communicate with the second node; the status indicates at least one of the group consisting of: that the first node has recently been powered on, that the first node will be powered off, a carrier frequency used by the first node, whether the first node is registered, and a location of the first node; the status is indicative of a location of the first node; the indication indicates a relative proximity of the first and second nodes; the indication indicates a zone or cell at which the second node is registered; the indication comprises a measurement report from the second node; the indication indicates whether the first node is receiving signals from the second node; the determination comprises determining the location of the first node, and the indication identifies the location; the method further comprises maintaining information indicative of a location of the second node, wherein the indication indicates whether the location of the first node is greater than or less than a defined distance away from the location of the second node; the determination comprises determining whether the first node is within a coverage area of the second node, and the indication indicates whether the first node is within the coverage area; the method further comprises monitoring for signals from the second node, wherein the indication indicates whether the first node is receiving signals from the second node; the determination comprises determining a relative proximity of the first node to the second node and the message comprises a request to the second node to, based on the relative proximity, either enable or disable transmissions on the at least one channel; the message comprises a registration message; the message is sent to a network mobility manager or to the second node, the at least one channel is associated with a first type of radio technology or a first carrier frequency, and the message is sent via a second type of radio technology or a second carrier frequency; the method further comprises using the second type of radio technology or second carrier frequency to monitor for signals from the second node, wherein the indication is generated based on the monitoring; the at least one channel comprises at least one of the group consisting of: an overhead channel, a paging channel, and an acquisition channel; the method further comprises: registering the first node at a third node, wherein beacons are received from the third node via a first carrier associated with a first nominal carrier frequency, receiving beacons from the second node as a result of sending the message, and performing a communication hand-in from the third node to the second node based on the receipt of the beacons, wherein the beacons are received from the second node via a second carrier associated with a second nominal carrier frequency; the second node is restricted to not provide, for at least one other node, at least one of the group consisting of: signaling, data access, registration, and service; or the second node comprises a femto node or a pico node.

Also in view of the above, in some aspects a third method of communication comprises: determining, at a first node, status of a second node; and sending, based on the determination, a message to control whether a third node transmits on at least one channel. In addition, in some aspects at least one of the following also may apply to the third method of communication: the status is indicative of whether the second node may attempt to communicate with the third node; the status indicates at least one of the group consisting of: that the second node has recently been powered on, that the second node will be powered off, a carrier frequency used by the second node, whether the second node is registered, and a location of the second node; the status is indicative of a location of the second node; the status relates to: a relative proximity of the first and second nodes, a zone or cell at which the second node is registered, a measurement report from the second node, or whether the first node is receiving signals from the second node; the determination comprises: maintaining information indicative of a location associated with the third node, determining the location of the second node, and determining whether the location of the second node is greater than or less than a defined distance away from the location associated with the third node; the determination of the location of the second node comprises receiving an indication relating to the location of the second node from the second node; the determination of the location of the second node further comprises calculating the location of the second node; the status is determined based on the second node registering at another node; the determination further comprises determining a zone or cell at which the second node registered; the determination comprises: receiving a registration message from the second node, and determining the status based on the registration message; the determination further comprises determining whether the second node is within a coverage area of the third node; the determination comprises receiving an indication of the status from the second node; the message comprises a request to the third node to either enable or disable transmissions on the at least one channel; the second node is authorized to access the third node, at least one other node is authorized to access the third node, the first node is further configured to determine status of the at least one other node, and the sending of the message is further based on the status of the at least one other node; the at least one channel comprises at least one of the group consisting of: an overhead channel, a paging channel, and an acquisition channel; the first node is a network mobility manager; the third node is restricted to not provide, for at least one other node, at least one of the group consisting of: signaling, data access, registration, and service; or the third node comprises a femto node or a pico node.

In some aspects, functionality corresponding to one or more of the above aspects of the first, second and third methods of communication may be implemented, for example, in an apparatus using structure as taught herein. In addition, a computer-program product may comprise codes configured to cause a computer to provide functionality corresponding to one or more of the above aspects of the first, second and third methods of communication.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
broadcasting control information from a first node on at least one control channel;
receiving, at the first node, information comprising location information that is indicative of a location of a second node;
determining whether the second node is outside a coverage area of the first node based at least in part on the location information;
determining, based at least in part on a determination that the second node is outside the coverage area of the first node, to disable broadcasting of the control information by the first node on the at least one control channel; and
maintaining, at the first node, an access control list including authorized nodes that are authorized to access the first node, the access control list including the second node and at least one other node,
wherein the first node is an access point, the second node is an access terminal, and the information further comprises whether the second node may attempt to communicate with the first node.

2. The method of claim 1, wherein the information further indicates at least one of the group consisting of: that the second node has recently been powered on, that the second node will be powered off, a carrier frequency used by the second node, whether the second node is registered, and a location of the first node.

3. The method of claim 1, wherein:
the information further indicates a relative proximity of the first and second nodes;
the information further indicates a zone or cell at which the second node is registered;
the information comprises a measurement report from the second node; or
the information further indicates whether the second node is receiving signals from the first node.

4. The method of claim 1, further comprising:
receiving, at the first node, information indicative of a location of the at least one other node;
disabling the broadcasting of the control information in response to a determination that none of the authorized nodes are within the coverage area of the first node.

5. The method of claim 1, wherein the information is received from a network mobility manager.

6. The method of claim 1, wherein the at least one control channel comprises at least one of the group consisting of: an overhead channel, a paging channel, and an acquisition channel.

7. The method of claim 1, wherein the first node is restricted from providing, for at least one other node, at least one of the group consisting of: signaling, data access, registration, and service.

8. The method of claim 1, further comprising:
authorizing the second node for access to the first node, prior to registration; and
registering the second node with the first node, prior to receiving the information indicative of the location of the second node.

9. The method of claim 1, further comprising determining whether there will be an imminent attempt by the second node to communicate with the first node during an authorized communication session.

10. The method of claim 1, wherein the disabling of the broadcasting of the control information comprises powering down at least one transmitter of the first node.

11. The method of claim 1, wherein the control information on the at least one control channel comprises a pilot or beacon signal.

12. The method of claim 1, further comprising receiving information indicating that the second node has recently been powered on or that the second node will be powered off.

13. The method of claim 1, wherein the broadcasting of the control information by the first node comprises broadcasting presence information on the at least one control channel over the coverage area served by the first node, the presence information identifying the first node as operating within the coverage area.

14. An apparatus for communication, comprising:
a communication controller configured to:
broadcast control information from a first node on at least one control channel;
receive, at the first node, information comprising location information that is indicative of a location of a second node;
a status processor configured to:
determine whether the second node is outside a coverage area of the first node based at least in part on the location information;
determine, based at least in part on a determination that the second node is outside the coverage area of the first node, to disable broadcasting of the control information by the first node on the at least one control channel; and
maintain an access control list including authorized nodes that are authorized to access the first node, the access control list including the second node and at least one other node,
wherein the first node is an access point, the second node is an access terminal, and the information further comprises whether the second node may attempt to communicate with the first node.

15. The apparatus of claim 14, wherein the information further indicates at least one of the group consisting of: that the second node has recently been powered on, that the second node will be powered off, a carrier frequency used by the second node, whether the second node is registered, and a location of the first node.

16. The apparatus of claim 14, wherein:
the information further indicates a relative proximity of the first and second nodes;
the information further indicates a zone or cell at which the second node is registered;
the information comprises a measurement report from the second node; or
the information further indicates whether the second node is receiving signals from the first node.

17. The apparatus of claim 14, the status processor being configured to:
receive information indicative of a location of the at least one other node; and
disable the broadcasting of the control information in response to a determination that none of the authorized nodes are within the coverage area of the first node.

18. An apparatus for communication, comprising:
means for broadcasting control information from a first node on at least one control channel;
means for receiving, at the first node, information comprising location information that is indicative of a location of a second node;
means for determining whether the second node is outside a coverage area of the first node based at least in part on the location information;
means for determining, based at least in part on a determination that the second node is outside the coverage area of the first node, to disable broadcasting of the control information by the first node on the at least one control channel; and
means for maintaining, at the first node, an access control list including authorized nodes that are authorized to access the first node, the access control list including the second node and at least one other node,
wherein the first node is an access point, the second node is an access terminal, and the information further comprises whether the second node may attempt to communicate with the first node.

19. The apparatus of claim 18, wherein the information further indicates at least one of the group consisting of: that the second node has recently been powered on, that the second node will be powered off, a carrier frequency used by the second node, whether the second node is registered, and a location of the first node.

20. The apparatus of claim 18, wherein:
the information further indicates a relative proximity of the first and second nodes;
the information further indicates a zone or cell at which the second node is registered;
the information comprises a measurement report from the second node; or
the information further indicates whether the second node is receiving signals from the first node.

21. The apparatus of claim 18, further comprising:
means for receiving, at the first node, information indicative of a location of the at least one other node; and
means for disabling the broadcasting of the control information in response to a determination that none of the authorized nodes are within the coverage area of the first node.

22. The apparatus of claim 18, wherein the information is received from a network mobility manager.

23. The apparatus of claim 18, wherein the at least one control channel comprises at least one of the group consisting of: an overhead channel, a paging channel, and an acquisition channel.

24. The apparatus of claim 18, wherein the first node is restricted from providing, for at least one other node, at least one of the group consisting of: signaling, data access, registration, and service.

25. A non-transitory computer-readable medium comprising code for causing a computer to:
broadcast control information from a first node on at least one control channel;
receive, at the first node, information comprising location information that is indicative of a location of a second node;
determine whether the second node is outside a coverage area of the first node based at least in part on the location information;
determine, based at least in part on a determination that the second node is outside the coverage area of the first node, to disable broadcasting of the control information by the first node on the at least one control channel; and maintain an access control list including authorized nodes that are authorized to access the first node, the access control list including the second node and at least one other node, wherein the first node is an access point, the second node is an access terminal, and the information further comprises whether the second node may attempt to communicate with the first node.

26. The non-transitory computer-readable medium of claim 25, wherein the information further indicates at least one of the group consisting of: that the second node has recently been powered on, that the second node will be powered off, a carrier frequency used by the second node, whether the second node is registered, and a location of the first node.

27. A method of communication, comprising:
receiving, at a first node, control information on at least one control channel;
determining, at the first node, information comprising location information that indicates a location of the first node; and
sending, to at least one of a network mobility manager or a second node, a message comprising the information to control whether the second node disables broadcasting of the control information on the at least one control channel in response to a determination that the first node is outside a coverage area of the second node,
wherein the first node is an access terminal, the second node is an access point, and the information further comprises whether the first node may attempt to communicate with the second node.

28. The method of claim 27, wherein the information further indicates at least one of the group consisting of: that the first node has recently been powered on, that the first node will be powered off, a carrier frequency used by the first node, whether the first node is registered, and a location of the first node.

29. The method of claim 27, wherein:
the information further indicates a relative proximity of the first and second nodes;
the information further indicates a zone or cell at which the second node is registered;
the information comprises a measurement report from the second node; or
the information further indicates whether the first node is receiving signals from the second node.

30. The method of claim 27, further comprising maintaining information indicative of the location of the second node, wherein the information indicates whether the location of the first node is greater than or less than a defined distance away from the location of the second node.

31. The method of claim 27, wherein the message comprises a request to the second node to either enable or disable a transmitter configured for transmissions on the at least one control channel.

32. The method of claim 27, wherein the at least one control channel comprises at least one of the group consisting of: an overhead channel, a paging channel, and an acquisition channel.

33. The method of claim 27, wherein the second node is restricted from providing, for at least one other node, at least one of the group consisting of: signaling, data access, registration, and service.

34. The method of claim 27, further comprising:
authorizing the first node for access to the second node, prior to registration; and
registering the first node with the second node, prior to determining the information relating to the location of the second node.

35. The method of claim 27, further comprising determining whether there will be an imminent attempt by the first node to communicate with the second node during an authorized communication session.

36. The method of claim 27, further comprising determining that the first node has recently been powered on or that the first node will be powered off.

37. An apparatus for communication, comprising:
a communication controller configured to receive, at a first node, control information on at least one control channel; and
a status processor configured to determine, at a first node, information comprising location information that indicates a location of the first node;
wherein the communication controller is further configured to send, to a network mobility manager and/or a second node, a message comprising the information to control whether a second node disables broadcasting of the control information on the at least one control channel in response to a determination that the first node is outside a coverage area of the second node, and
wherein the first node is an access terminal, the second node is an access point, and the information further comprises whether the first node may attempt to communicate with the second node.

38. The apparatus of claim 37, wherein the information further indicates at least one of the group consisting of: that the first node has recently been powered on, that the first node will be powered off, a carrier frequency used by the first node, whether the first node is registered, and a location of the first node.

39. The apparatus of claim 37, wherein:
the information further indicates a relative proximity of the first and second nodes;
the information further indicates a zone or cell at which the second node is registered;
the information comprises a measurement report from the second node; or
the information further indicates whether the first node is receiving signals from the second node.

40. The apparatus of claim 37, further comprising a data memory for maintaining information indicative of the location of the second node, wherein the information indicates whether the location of the first node is greater than or less than a defined distance away from the location of the second node.

41. An apparatus for communication, comprising:
means for receiving, at a first node, control information on at least one control channel;
means for determining, at the first node, information comprising location information that indicates a location of the first node; and
means for sending, to a network mobility manager and/or a second node, a message comprising the information to control whether a second node disables broadcasting of the control information on the at least one control channel in response to a determination that the first node is outside a coverage area of the second node,
wherein the first node is an access terminal, the second node is an access point, and the information is further indicative of whether the first node may attempt to communicate with the second node.

42. The apparatus of claim 41, wherein the information indicates at least one of the group consisting of: that the first node has recently been powered on, that the first node will be powered off, a carrier frequency used by the first node, whether the first node is registered, and a location of the first node.

43. The apparatus of claim 41, wherein:
the information further indicates a relative proximity of the first and second nodes;
the information further indicates a zone or cell at which the second node is registered;
the information comprises a measurement report from the second node; or
the information further indicates whether the first node is receiving signals from the second node.

44. The apparatus of claim 41, further comprising means for maintaining information indicative of the location of the second node, wherein the information indicates whether the location of the first node is greater than or less than a defined distance away from the location of the second node.

45. The apparatus of claim 41, wherein the message comprises a request to the second node to either enable or disable a transmitter configured for transmissions on the at least one control channel.

46. The apparatus of claim 41, wherein the at least one control channel comprises at least one of the group consisting of: an overhead channel, a paging channel, and an acquisition channel.

47. The apparatus of claim 41, wherein the second node is restricted from providing, for at least one other node, at least one of the group consisting of: signaling, data access, registration, and service.

48. A non-transitory computer-readable medium comprising code for causing a computer to:
receive, at a first node, control information on at least one control channel;
determine, at the first node, information comprising location information that indicates a location of the first node; and
send, to at least one of a network mobility manager or a second node, a message comprising the information to control whether the second node disables broadcasting of the control information on the at least one control channel in response to a determination that the first node is outside a coverage area of the second node,
wherein the first node is an access terminal, the second node is an access point, and the information further comprises whether the first node may attempt to communicate with the second node.

49. The non-transitory computer-readable medium of claim 48, wherein the information further indicates at least one of the group consisting of: that the first node has recently been powered on, that the first node will be powered off, a carrier frequency used by the first node, whether the first node is registered, and a location of the first node.

50. A method of communication, comprising:
receiving, at a first node, information comprising location information that indicates a location of a second node;
determining, at the first node and based on the received information, whether the second node is outside a coverage area of a third node; and
sending to the third node from the first node, based on the determination, a message to control whether the third node disables broadcasting of control information to the second node on at least one control channel in response to a determination that the second node is outside the coverage area of the third node,
wherein the first node is a network node, the second node is an access terminal, the third node is an access point, and the information further comprises whether the second node may attempt to communicate with the third node.

51. The method of claim 50, further comprising determining at least one of the group consisting of: that the second node has recently been powered on, that the second node will be powered off, a carrier frequency used by the second node, whether the second node is registered, and a location of the second node.

52. The method of claim 50, further comprising determining:
a relative proximity of the first and second nodes;
a zone or cell at which the second node is registered;
a measurement report from the second node; or
whether the first node is receiving signals from the second node.

53. The method of claim 50, wherein the determining comprises:
maintaining information indicative of a location associated with the third node;
determining the location of the second node; and
determining whether the location of the second node is greater than or less than a defined distance away from the location associated with the third node.

54. The method of claim 50, wherein the message comprises a request to the third node to either enable or disable a transmitter configured for transmissions on the at least one control channel.

55. The method of claim 50, further comprising:
maintaining, at the first node, an access control list including authorized nodes that are authorized to access the third node, the access control list including the second node and at least one other node; and
determining a location of the at least one other node;
the sending of the message being further in response to a determination that none of the authorized nodes are within the coverage area of the third node.

56. The method of claim 50, wherein the at least one control channel comprises at least one of the group consisting of: an overhead channel, a paging channel, and an acquisition channel.

57. The method of claim 50, wherein the third node is restricted from providing, for at least one other node, at least one of the group consisting of: signaling, data access, registration, and service.

58. The method of claim 50, further comprising:
authorizing the second node for access to the third node, prior to registration; and
registering the second node with the third node, prior to determining the location of the second node.

59. The method of claim 50, further comprising determining whether there will be an imminent attempt by the second node to communicate with the third node during an authorized communication session.

60. The method of claim 50, further comprising determining that the second node has recently been powered on and that the second node will be powered off.

61. An apparatus for communication, comprising:
a communication controller configured to receive, at a first node, information comprising location information that indicates a location of a second node; and a status controller configured to determine, at the first node and based on the received information, whether the second node is outside a coverage area of a third node;

wherein the communication controller is further configured to send to the third node from the first node, based on the determination, a message to control whether the third node disables broadcasting of control information to the second node on at least one control channel in response to a determination that the second node is outside the coverage area of the third node, wherein the first node is a network node, the second node is an access terminal, the third node is an access point, and the information further comprises whether the second node may attempt to communicate with the third node.

62. The apparatus of claim 61, the status controller being further configured to determine at least one of the group consisting of: that the second node has recently been powered on, that the second node will be powered off, a carrier frequency used by the second node, or whether the second node is registered, and a location of the second node.

63. The apparatus of claim 61, the status controller being further configured to determine:
a relative proximity of the first and second nodes;
a zone or cell at which the second node is registered;
a measurement report from the second node; or
whether the first node is receiving signals from the second node.

64. An apparatus for communication, comprising:
means for receiving, at a first node, information comprising location information that indicates a location of a second node;
means for determining, at the first node and based on the received information, whether the second node is outside a coverage area of a third node; and
means for sending to the third node from the first node, based on the determination, a message to control whether the third node disables broadcasting of control information to the second node on at least one control channel in response to a determination that the second node is outside the coverage area of the third node,
wherein the first node is a network node, the second node is an access terminal, the third node is an access point, and the information further comprises whether the second node may attempt to communicate with the third node.

65. The apparatus of claim 64, further comprising means for determining at least one of the group consisting of: that the second node has recently been powered on, that the second node will be powered off, a carrier frequency used by the second node, or whether the second node is registered, and a location of the second node.

66. The apparatus of claim 64, further comprising means for determining:
a relative proximity of the first and second nodes;
a zone or cell at which the second node is registered;
a measurement report from the second node; or
whether the first node is receiving signals from the second node.

67. The apparatus of claim 64, the means for determining comprising:
means for maintaining information indicative of a location associated with the third node;
means for determining a location of the second node; and
means for determining whether the location of the second node is greater than or less than a defined distance away from the location associated with the third node.

68. The apparatus of claim 64, wherein the message comprises a request to the third node to either enable or disable a transmitter configured for transmissions on the at least one control channel.

69. The apparatus of claim 64, further comprising:
means for maintaining, at the first node, an access control list including authorized nodes that are authorized to access the third node, the access control list including the second node and at least one other node; and
means for determining a location of the at least one other node;
means for the sending of the message comprising means for sending the message further in response to a determination that none of the authorized nodes are within the coverage area of the third node.

70. The apparatus of claim 64, wherein the at least one control channel comprises at least one of the group consisting of: an overhead channel, a paging channel, and an acquisition channel.

71. A non-transitory computer-readable medium comprising code for causing a computer to:
receive, at a first node, information comprising location information that indicates a location of a second node;
determine, at the first node and based on the received information, whether the second node is outside a coverage area of a third node; and
send to the third node from the first node, based on the determination, a message to control whether the third node disables broadcasting of control information to the second node on at least one control channel in response to a determination that the second node is outside the coverage area of the third node,
wherein the first node is a network node, the second node is an access terminal, the third node is an access point, and the information further comprises whether the second node may attempt to communicate with the third node.

72. The non-transitory computer-readable medium of claim 71, the non-transitory computer-readable medium further comprising code for causing a computer to determine at least one of the group consisting of: that the second node has recently been powered on, that the second node will be powered off, a carrier frequency used by the second node, whether the second node is registered, and a location of the second node.

73. A method of managing interference, the method comprising:
broadcasting, from an access point, presence information on a control channel over a coverage area served by the access point, wherein the presence information identifies the access point as operating within the coverage area;
determining a coverage status of one or more access terminals with respect to the coverage area of the access point, wherein the one or more access terminals are authorized to access and operate on the access point;
disabling the broadcasting by the access point of the presence information on the control channel based on the coverage status indicating that none of the one or more access terminals are within the coverage area of the access point; and
determining whether the one or more access terminals may attempt to communicate with the access point.

* * * * *